United States Patent [19]
Ohba et al.

[11] Patent Number: 5,588,003
[45] Date of Patent: Dec. 24, 1996

[54] LAN-WAN-LAN COMMUNICATION METHOD, AND APPARATUS FOR LAN-WAN CONNECTION

[75] Inventors: Toshimitsu Ohba; Kiyotaka Shikata; Osamu Sekihata, all of Kawasaki, Japan

[73] Assignee: Fujitsu Limited, Kanagawa, Japan

[21] Appl. No.: 198,070

[22] Filed: Feb. 17, 1994

[30] Foreign Application Priority Data

May 26, 1993 [JP] Japan ...................................... 5-123720

[51] Int. Cl.$^6$ ...................................................... H04J 3/16
[52] U.S. Cl. ............................................ 370/468; 370/536
[58] Field of Search ............................. 370/85.13, 85.14, 370/85.12, 85.1, 85.15, 85.9, 94.3, 84, 85.7, 60, 110.1, 118, 79, 94.1; 340/825.05; 375/38, 36, 118, 119; 371/1

[56] References Cited

U.S. PATENT DOCUMENTS

| | | | |
|---|---|---|---|
| 5,058,133 | 10/1991 | Duncanson et al. ...................... | 375/38 |
| 5,172,372 | 12/1992 | Konishi ................................. | 370/85.13 |
| 5,179,555 | 1/1993 | Videlock et al. ...................... | 370/85.13 |
| 5,258,979 | 11/1993 | Oomuro et al. ........................ | 370/95.1 |
| 5,313,467 | 5/1994 | Varghese et al. ...................... | 370/94.1 |
| 5,317,568 | 5/1994 | Bixby et al. ........................... | 370/85.13 |

*Primary Examiner*—Douglas W. Olms
*Assistant Examiner*—Ajit Patel

[57] ABSTRACT

A LAN-WAN-LAN communication method and apparatus for performing communication between a LAN on a transmitting side and a LAN on a receiving side via a wide area network within limits of an allocated band includes a demultiplexer/multiplexer unit for demultiplexing data, which has been received from the LAN on the transmitting side, into data constituting the smallest units of information and transmitting this data via a plurality of lines. Then, data, which is sent to the receiving side via each line, is multiplexed on the receiving side and the multiplexed data is sent to the LAN on the receiving side. A traffic monitoring unit is provided for monitoring traffic between LANS. A band is obtained, which is required for communication between LANs based upon the traffic. Communication between LANs is performed by increasing, decreasing or maintaining the number of lines, which are used in communication between LANS, based upon the obtained band.

23 Claims, 16 Drawing Sheets

FIG.4A

| TRAFFIC | REQUIRED BAND f' |
|---|---|
|  |  |
|  |  |
|  |  |

| APPLICATION | REQUIRED BAND |
|---|---|
| F T P |  |
| T E L N E T |  |
| --- | --- |

| LAN-TO-LAN COMMUNICATION | ALLOCATED BAND |
|---|---|
| COMMUNICATION BETWEEN LAN 11 AND LAN 12 | Fi |
| ----- | --- |

BM

FRAME CONSTITUTION

P : FLAG INDICATIVE OF SYNCHRONIZING DATA
S : FLAG INDICATIVE OF SYNCHRONIZATION ESTABLISHMENT
E : FLAG INDICATIVE OF EFFECTIVE DATA
D : FLAG INDICATIVE OF DISCONNECTED LINE

FIG. 17A

| | | | | | |
|---|---|---|---|---|---|
| #1 | | SE | | SE | |
| #2 | | SE | | SE | |
| #3 | SE | | | SE | |
| #4 | SED | | | SED | |
| #5 | | SED | | SED | |

FIG. 17B

| | | | | | |
|---|---|---|---|---|---|
| #1 | | SE | | SE | |
| #2 | | SE | | SE | |
| #3 | SE | | | SE | |
| #4 | SD | | | SD | |
| #5 | | SD | | SD | |

FIG. 17C

| | | | | | |
|---|---|---|---|---|---|
| #1 | | SE | | SE | |
| #2 | | SE | | SE | |
| #3 | SE | | | SE | |
| #4 | | | | | |
| #5 | | | | | |

LAN-WAN-LAN COMMUNICATION METHOD, AND APPARATUS FOR LAN-WAN CONNECTION

BACKGROUND OF THE INVENTION

This invention relates to a LAN-WAN-LAN communication method whereby communication between LANs is achieved via a wide area network, as well as to a LAN-WAN connecting apparatus. More particularly, the invention relates to a LANN-WAN-LAN communication method, and a LAN-WAN connecting apparatus, in which LAN-WAN-LAN communication is performed by band allocation and line selection in conformity with traffic and type of application.

In order to interconnect LANs (local area networks) that are remote from each other, a so-called wide area network (WAN) such as a public switched telephone network, public data switched network, ISDN or leased line is used as the intermediary. Routers are provided between each LAN and the WAN. The router is connected to the LAN to control physical layers, a data link layer and a network layer, which are first, second and third layers, and is connected to the WAN to control the interface to the WAN as well as the network thereof. When a terminal sends out a frame with an attached network address in a communication system thus interconnecting LANs via a WAN, the router accepts the frame, refers to the network address and sends this frame to the LAN of the other party via the WAN. The router connected to the LAN of the other party accepts the frame and sends it to the LAN, where the destination terminal accepts the frame.

In presently existing WANs, lines have a narrow band. When there is a large increase in traffic in a connection between LANs, the data transfer rate in a WAN suddenly drops to 2400 bps, and this declines to 64 Kbps even when a comparatively fast ISDN Bch is employed. Consequently, a file transfer that ends in several seconds within one and the same LAN is slowed down at the moment the data is passed through the WAN.

Accordingly, consideration has been given to interconnecting LANs by borrowing a fast leased line. However, employing a leased line results in higher communication cost. In particular, since the characteristic of communication using a LAN is such that data does not flow at all times but only when the necessary data is generated (so-called bursty transmission), the fact that there are long periods of idleness between short periods of transmission becomes a problem when a leased line is used.

SUMMARY OF THE INVENTION

Accordingly, a first object of the present invention is to provide a LAN-WAN-LAN communication method, as well as a LAN-WAN connecting apparatus, whereby a user can be given the impression of communication being performed over a single LAN without the intermediary of a WAN.

A second object of the present invention is to provide a LAN-WAN-LAN communication method, as well as a LAN-WAN connecting apparatus, in which band is allocated and line selection is performed in dependence upon traffic and type of application so that high-speed transfer and economical communication can be achieved even via a WAN.

A third object of the present invention is to provide a LANN-WAN-LAN communication method, as well as a LAN-WAN connecting apparatus, whereby the allocated band can be increased and decreased in conformity with traffic to enable economical, high-speed communication.

A fourth object of the present invention is to provide a LAN-WAN-LAN communication method, as well as a LAN-WAN connecting apparatus, in which the allocated band can be controlled by increasing or decreasing the number of lines multiplexed on the basis of traffic.

A fifth object of the present invention is to provide a LAN-WAN-LAN communication method, as well as a LAN-WAN connecting apparatus, in which synchronization of data among a number of lines can be performed without momentary interruption of data transfer when the allocated band is controlled by increasing or decreasing the number of lines multiplexed.

A sixth object of the present invention is to provide a LAN-WAN-LAN communication method in which a virtual circuit can be established and maintained (a released line reserved) automatically when the quantity of data transferred becomes small, whereby it is possible to avoid failure to acquire a line because the line is busy when it becomes necessary to widen the allocated band, and start-up of data transmission can be performed smoothly.

In accordance with the present invention, the first and second objects set forth above are attained by determining traffic between LANs when a new frame transfer request has been issued or identifying the type of application of a LAN terminal that has issued a frame transfer request, obtaining a band required for the new frame transfer based upon the traffic or type of application, and performing communication upon increasing the number of lines used in communication between LANs in such a manner that the band obtained is satisfied.

In accordance with the present invention, the first through fourth objects set forth above are attained by demultiplexing data, which has been accepted from a LAN on a transmitting side, into data constituting smallest units of information, transmitting this data via a plurality of lines, multiplexing data, which arrives via each line, on a receiving side and sending the multiplexed data to LAN on the receiving side, monitoring traffic between LANs, obtaining a band required for communication between LANs based upon the traffic, and performing communication upon increasing, decreasing or maintaining the number of lines, which are used in communication between LANs, based upon the band.

Further, in accordance with the present invention, the fifth object set forth above is attained by the following in a case where the number lines is increased: transmitting data on at least one line used thus far in communication between LANs upon setting a synchronizing flag in the data, and transmitting data identical with the data for which the synchronizing flag has been set on an additional line used anew in communication between LANs; before synchronization is established, and on a receiving side, multiplexing only the data on lines used thus far in communication between LANs, sending the multiplexed data to a LAN on the receiving side, synchronizing lines for which the synchronizing flags have been detected and notifying a transmitting side of establishment of synchronization; and, after synchronization is established, and on the transmitting side, demultiplexing data accepted from the LAN on the transmitting side into data constituting smallest units of information, transmitting this data to the receiving side via the lines used thus far and additional lines, and, on the receiving side, multiplexing the data that arrives from each line and sending this multiplexed data to the LAN on the receiving side.

Further, in accordance with the present invention, the fifth object set forth above is attained by the following in a case where the number lines is decreased: on the transmitting side, transmitting data, on a line to be disconnected, to the receiving side upon setting a line-disconnection flag in the data, and transmitting data on the other lines without setting a line-disconnection flag in the data; and, on the receiving side, recognizing a line to be disconnected by detecting the line-disconnection flag, and thenceforth multiplexing data sent to the receiving side via lines other than the line to be disconnected and sending this multiplexed data to the LAN on the receiving side.

Further, in accordance with the present invention, the sixth object set forth above is attained by the following in a case where a line is disconnected: reserving a prescribed number of lines in advance and refraining from using these lines in communication with other LANs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4(A–C) are diagrams for describing a required-band table, in which FIG. 4A is a correspondence table showing the correspondence between traffic and required bands, FIG. 4B is a correspondence table showing the correspondence between applications and required bands, and FIG. 4C a memory for storing allocated bands, namely bands allocated between LANs;

FIGS. 5(A–B) are diagrams for describing an LCR table, in which

FIG. 15 is a diagram for describing synchronizing and data transfer processing executed when lines are increased, in which

FIGS. 17(A–C) are diagrams for describing synchronizing and data transfer processing executed when lines are reduced, in which FIGS. 17A, 17B and 17C illustrate the contents of flag data transmitted from a transmitting side to a receiving side up to the moment of line disconnection.

DESCRIPTION OF THE PREFERRED EMBODIMENTS (a) Overview of the Invention

Figure 1:
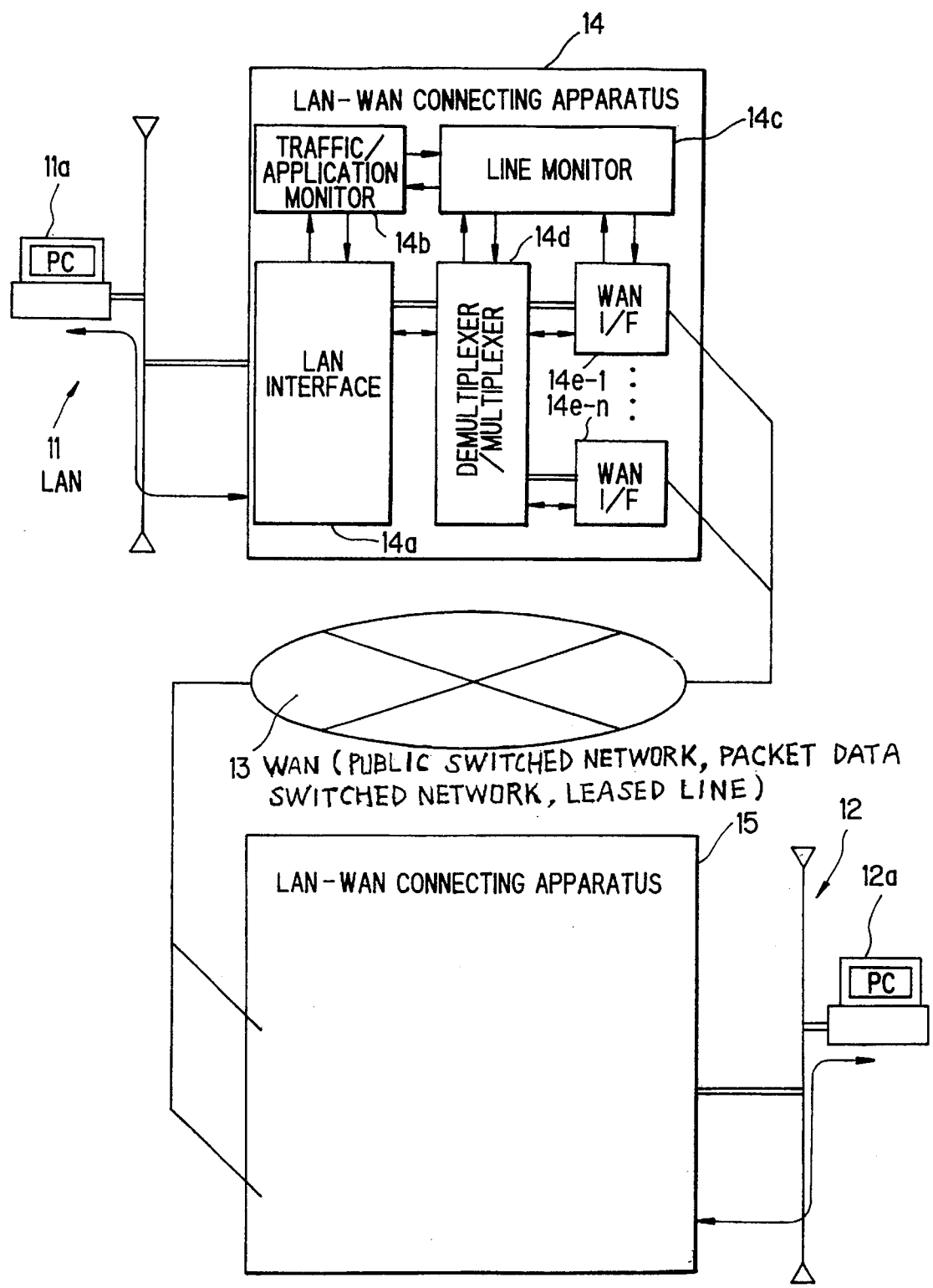
FIG. 1 is a diagram for describing the general features of the present invention.

FIG. 1 is a diagram for describing the general features of the present invention. Shown in FIG. 1 are LANs 11, 12, terminals 11a, 12a such as personal computers connected to the LANs 11, 12, respectively, a wide area network (WAN) 13 (public switched network, a data packet switched network, a leased line, etc.), and LAN-WAN connection apparatus 14, 15, which are identical in construction.

The LAN-WAN connection apparatus 14 includes: a LAN interface 14a; a traffic/application monitoring functional unit 14b which, when a new frame transfer request is produced, obtains the required band (transfer rate) by monitoring the traffic between the LANs or the type of application of the terminal, or obtains the traffic prevailing during communication and performs monitoring to determine whether a band greater than that necessary has been allocated. The apparatus 14 further includes a line monitoring functional unit 14c which increases the number of lines, on the basis of the required band designated by the traffic/application monitoring functional unit, when there is a new frame transfer request, and decreases the number of lines if a band greater than necessary has been allocated. The apparatus 14 further includes a demultiplexing/multiplexing functional unit 14d for demultiplexing data, which enters from the LAN interface, into data on a plurality of lines and then outputting the data, and for multiplexing data, which has entered from a plurality of lines, and inputting the multiplexed data to the LAN interface 14a. Also included are WAN interfaces 14e-1~14e-n connected to respective ones of the lines.

The traffic/application monitoring functional unit 14b monitors the traffic between LANs or the type of application of a LAN terminal. The unit 14b obtains the band necessary for LAN-WAN-LAN communication based upon the traffic prevailing when a request for transfer of a new frame between LANs is issued, or on the basis of the type of application. The line monitoring functional unit 14 increases the number of lines used in the communication between LANs so as to satisfy the band obtained. Since it is thus arranged to increase the band in conformity with the traffic or the type of application, data can be transferred at high speed and the user can be given the impression of communication being performed within a single LAN without the intermediary of a WAN. Further, a table is provided for storing the types of optimum lines or the number of lines in conformity with the required band. The line monitoring functional unit 14c refers to the table to decide the types of lines or the number of lines. This makes possible economical, high-speed communication.

Furthermore, the number of lines used in communication between LANs is increased in conformity with the traffic or type of application. The demultiplexing/multiplexing functional unit 14d demultiplexes the data, which has been accepted from the LAN 11 on the transmitting side, into data on a plurality of lines and transmits the data on these lines. The demultiplexing/multiplexing functional unit on the receiving side multiplexes data that has arrived via each line and sends the multiplexed data to the LAN 12 on the receiving side. As a result of this arrangement, even though the lines are narrow-band lines, the number of lines bundled is controlled to make the bundle slender or thick, whereby the band can be controlled from the narrow-band to the wide-band region.

In a case where the number of lines is increased dynamically during communication, synchronization between lines is necessary. However, rather than pass a synchronizing pattern, the demultiplexing/multiplexing functional unit 14d attaches a synchronizing flag to the transmission data, transmits the data and performs synchronization using the flag. In accordance with this arrangement, even if the number of lines increases during communication, synchronization of the data among a number of lines can be carried without a momentary interruption in the data transfer. This makes it possible to perform a data transfer continuously without a decline in communication efficiency or a decline in reliability.

Furthermore, a table is provided for storing data indicating, for each line (each of the WAN interfaces 14e-1~14en), whether the line is idle or not. In a case where enough idle lines for satisfying the required band do not exist, the required band is reduced and data communication is performed using the idle lines. This makes possible optimum LAN-to-LAN communication conforming to the existing conditions.

The traffic/application monitoring functional unit 14b monitors traffic between LANs during communication and, on the basis of the traffic monitored, decides whether to decrease, maintain or increase the number of lines presently in use. In a case where it is required to decrease the number of lines, the line monitoring functional unit 14c disconnects the lines that are unnecessary. As a result, economical LAN-to-LAN communication commensurate with traffic can be performed while maintaining high speed. A line-tariff monitoring timer is provided for each line. The traffic is determined and the above-mentioned decision to disconnect unnecessary lines is made before the line-tariff monitoring timer runs out of time, i.e., immediately before the line user fee increases. This makes it possible to reduce lines in economical fashion.

Furthermore, in a case where the number of lines is reduced, the demultiplexing/multiplexing functional unit 14d sets a line-disconnection flag for data transmitted via a line to be disconnected and then transmits this data. Data transmitted via other lines that will not be disconnected is transmitted without the unit 14d setting the line-disconnection flag. On the receiving side a disconnected line is recognized by the line-disconnection flag, after which the data that arrives via lines other than the disconnected line is multiplexed and then sent to the LAN on the receiving side. As a result, even if the number of lines is reduced during data communication, there will be no interruption in data transfer accompanying line disconnection. This makes it possible to transfer data in continuous fashion.

In a case where a line is disconnected, the line monitoring functional unit 14c reserves at least one line and does not use it in communication with other LANs. When it becomes necessary to widen the band, the reserved line is used. As a result, it is possible to avoid a situation in which a line cannot be acquired because it is busy. In addition, start-up of data transmission can be performed smoothly.

(b) Embodiment (b-1) Overall Configuration

Figure 2:
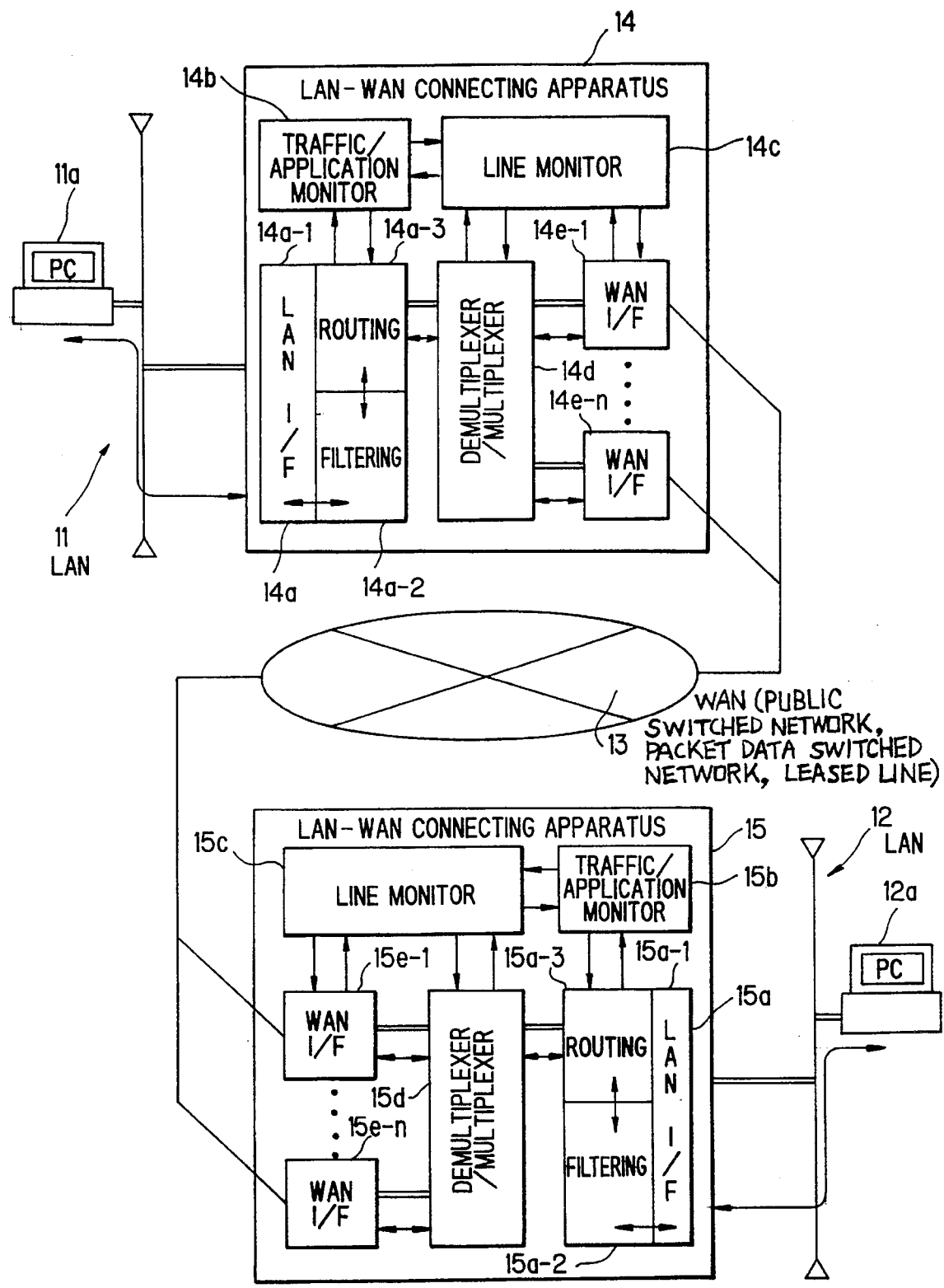
FIG. 2 is a diagram illustrating the configuration of a communication system according to the invention.

FIG. 2 is a diagram illustrating the configuration of a communication system for implementing the LAN-to-LAN communication method according to the present invention. The system includes the LANs 11, 12, the terminals 11a, 12a such as personal computers connected the LANs 11, 12, respectively, the wide-area network (WAN) 13 (a pay station line, a packet network, a leased circuit network, etc.), and the LAN-WAN connection apparatus 14, 15, which are identical in construction.

The LAN-WAN connection apparatus 14, 15 include LAN interfaces 14a, 14b, traffic/application monitoring functional units 14b, 15b, line monitoring functional units 14c, 15c, demultiplexing/multiplexing functional units 14d, 15d, and WAN interfaces 14e-1~14e-n, 15e-1~15e-n connected to corresponding lines, respectively.

(b-2) LAN Interface

Figure 3:
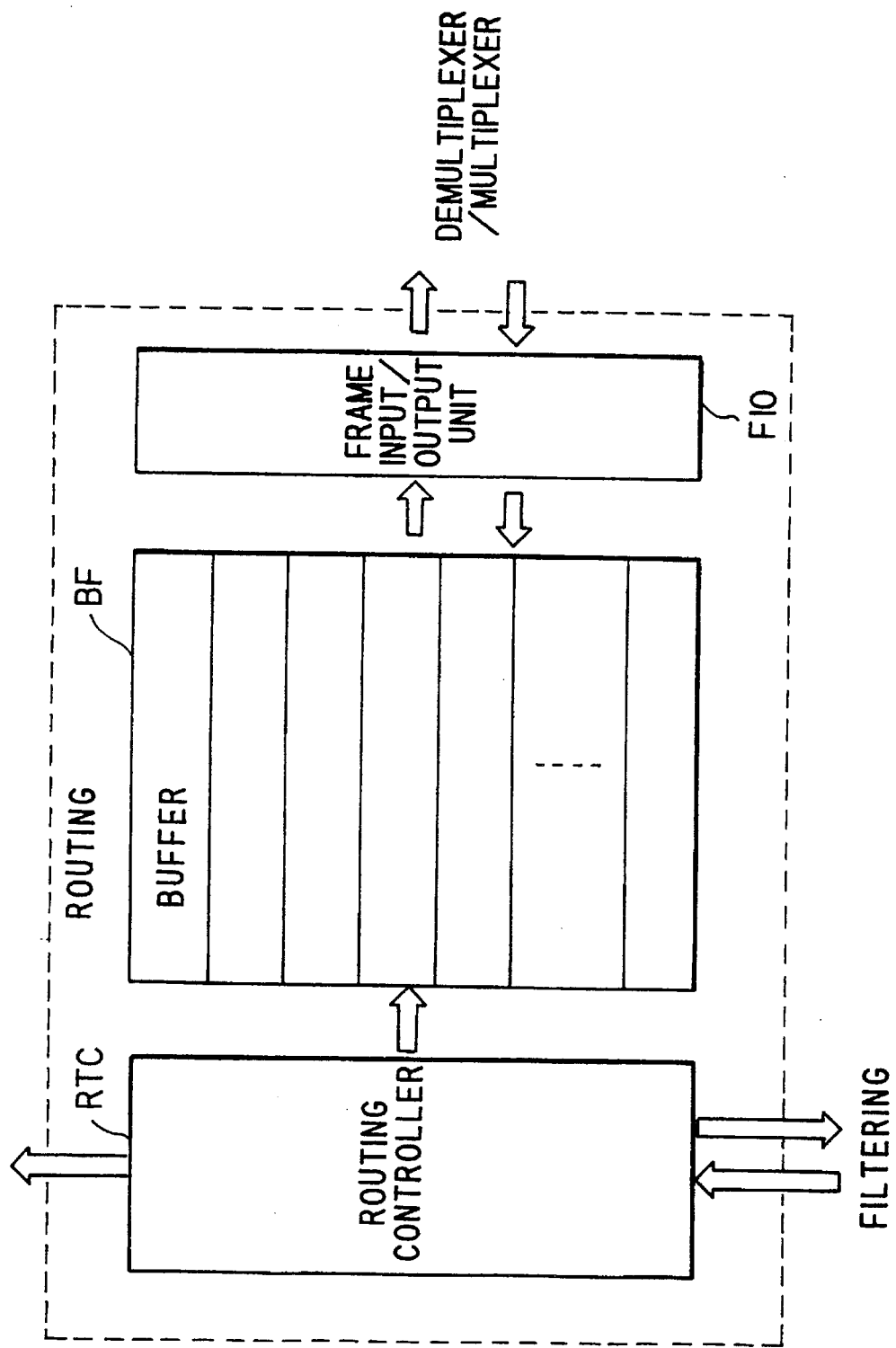
FIG. 3 is a diagram showing the construction of a routing functional unit.

The LAN interfaces 14a, 15a respectively include LAN interface units 14a-1, 15a-1 connected to the LANs, filtering functional units 14a-2, 15a-2 that accept frames requiring transmission via the WAN 13, and routing functional units 14a-3, 15a-3. Each routing functional unit stores frames, which have been accepted by the filtering functional unit, in an internal buffer for each and every transfer destination, reads frames out of the buffer successively and outputs the frames, accepts frames that have entered via the WAN and sends these frames to the LAN. As shown in FIG. 3, the routing functional unit has a routing controller RTC, a buffer BF, which temporarily stores frames, for each LAN that is a destination of transmission, and a frame input/output unit FIO.

(b-3) Traffic/Application Monitoring Functional Unit

The traffic/application monitoring functional units 14b, 15b are constituted by microcomputers and ① when a request for transfer of a new frame has been issued, determine the required band by monitoring the traffic between LANs or the type of application of the terminal and ② obtain the traffic during communication and perform monitoring to determine whether a band greater than that necessary has been allocated. The traffic/application monitoring functional units 14b, 15b are provided with tables TL1, TL2, respectively, for storing the required bands in correlation with traffic or type of application, as shown in FIG. 4. The units 14b, 15b are provided also with a memory BM for storing a band Fi allocated to communication with each LAN.

The traffic between prescribed LANs can be obtained by using the number of frames residing in the buffer BF, which is provided in the routing function units 14a-3, 15a-3, for each LAN that is a destination of transfer, or by using residence time (delay time) in the buffer, or by using line utilization rate calculated based upon the band (held for each LAN that is a destination of communication) allocated to. LAN-to-LAN communication and the band in actual use. The type of application of the terminal can be obtained as follows in case of TCP/IP (transmission control protocol/ Internet protocol), which is one LAN protocol. Specifically, according to TCP/IP, the application of a file transfer is referred to as "FTP", and the application of a virtual terminal is referred to as "TELNET". The types of applications are entered in a source port section and address port section of a TCP header. Accordingly, the type of application can be identified by referring to the port number (FTP: port number 21; TELNET: port number 23) in the header of the TCP. It should be noted that FTP requires a high-speed data transfer while a low-speed data transfer suffices for TELNET.

(b-4) Line Monitoring Functional Unit

Figure 5A:
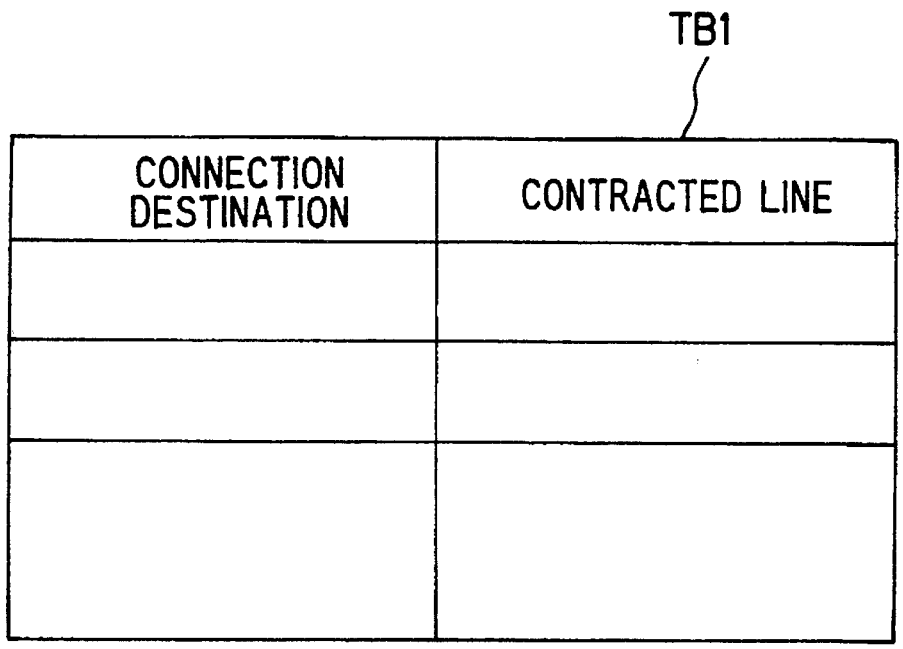
FIG. 5A is a correspondence table showing the correspondence between connection destinations and contract lines and FIG. 5B is a correspondence table showing the correspondence among required bands, types of lines and numbers of lines.
Figure 5B:
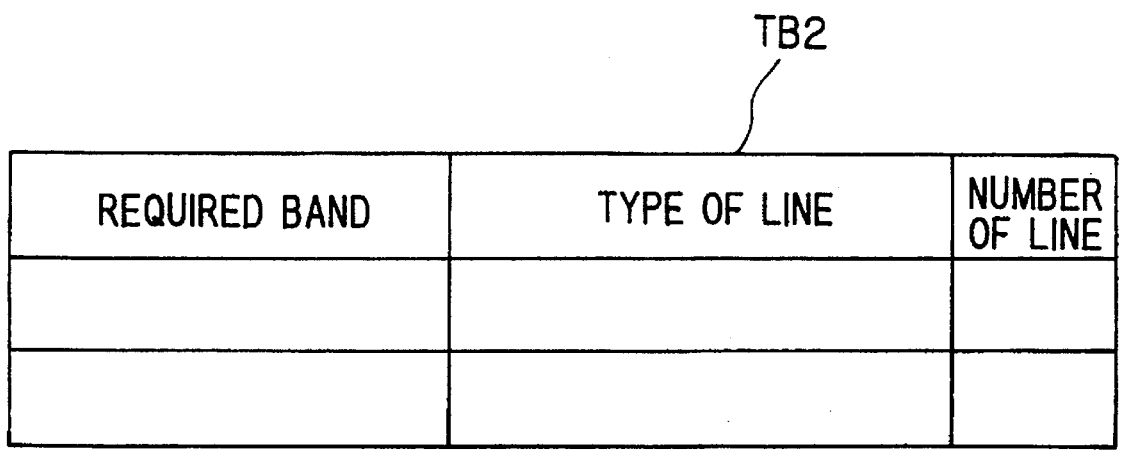

The line monitoring functional units 14c, 15c are constituted by microcomputers and ① when a frame transfer request is issued, decide the types of lines or the numbers of lines based upon the required band designated by the traffic/application monitoring functional units 14b, 15b, and ② in a case where a band greater than that necessary is allocated for communication between prescribed LANs, perform control to reduce the number of lines. The line monitoring functional unit 14c, 15c are provided with LCR tables TB1, TB2 shown in FIG. 5 and with a line-resource management table LRTB shown in FIG. 6. More specifically the LCR tables include the table TB1, which stores the correspondence between connection destinations (addresses) and contracted lines, and the table TB2, which stores the correspondence among the required bands, the types of lines and the numbers of lines. A contracted line is a line provided by a communication service business (NTT, NCC, etc.). Since the billing system differs depending upon the connection destination, a contracted line having a low communication cost is made to correspond to the connection destination. Types of lines are an INS net 64, a packet network, etc. The types and numbers of lines capable of high-speed, economical communication are made to correspond in dependence upon the required band. The line-resource management table LRTB stores connection destination, contracted lines, line-tariff monitoring timers and an indication of reservation in correspondence with the WAN interfaces 14e-1~14e-n, 15e-1~15e-n. Line types and the numbers thereof used in communication between prescribed LANs can be specified by referring to the connection destination of each WAN interface. If the line user's fee is added up every three minutes, for example, the line-tariff monitoring timer will count the number of times (M) three minutes has elapsed as well as a length of time (m) up to three minutes. The timers are always updated at the time of connection. The purpose of reservation is to arrange it so that when a line is released, the line will not be used in communication with another LAN.

(b-5) Demultiplexing/Multiplexing Functional Unit

The demultiplexing/multiplexing functional units 14d, 15d demultiplex the series of frames that enter from the LAN interfaces 14a, 15a, respectively, and output the demultiplexed frames on a plurality of lines. These units 14d, 15d also multiplex frames that have entered from the WAN 13 via each line and send these frames to the LAN interfaces 14a, 15a, respectively.

Figure 7:
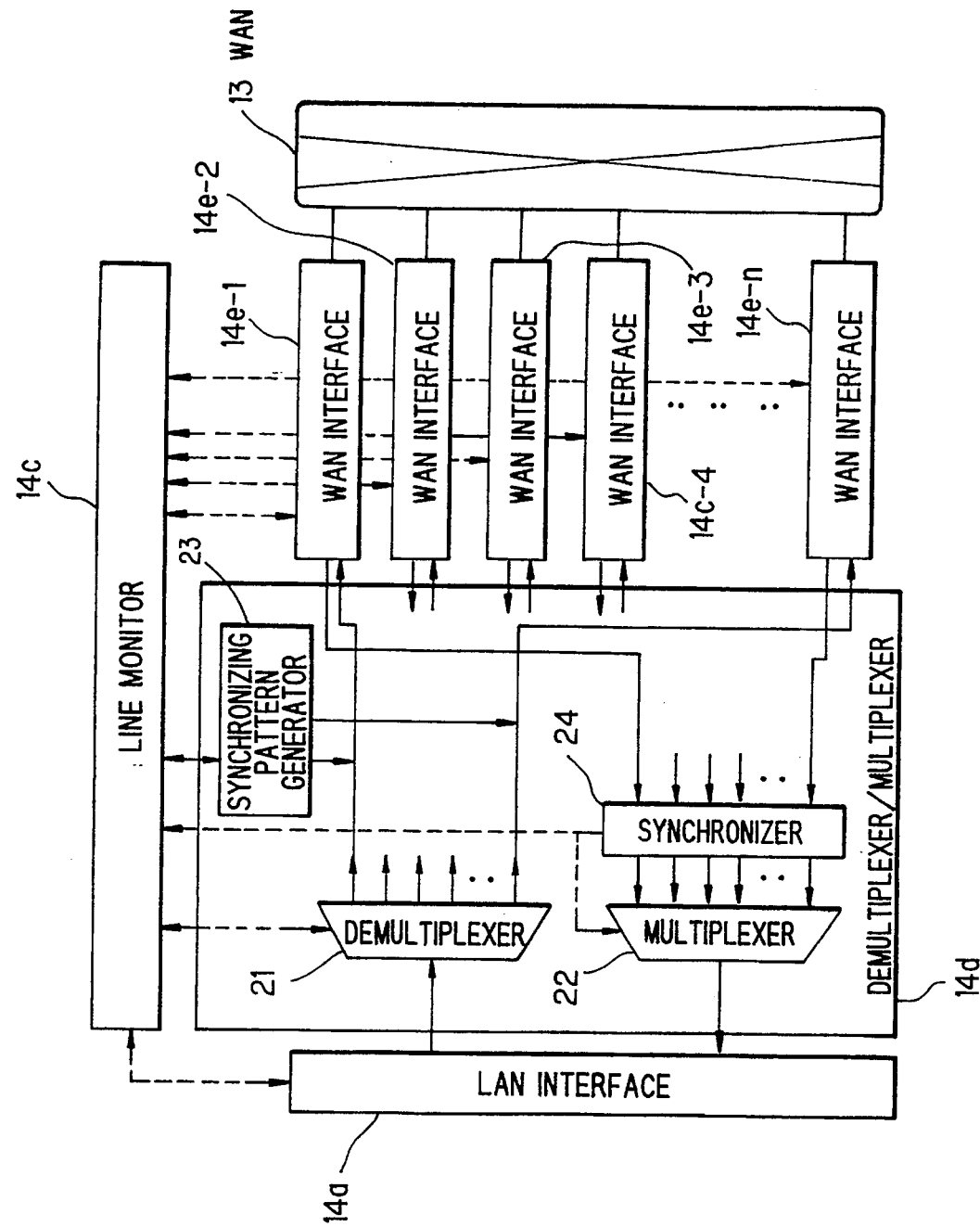
FIG. 7 is a is a diagram showing the construction of a demultiplexing/multiplexing functional units and the peripheral elements.
Figure 8:
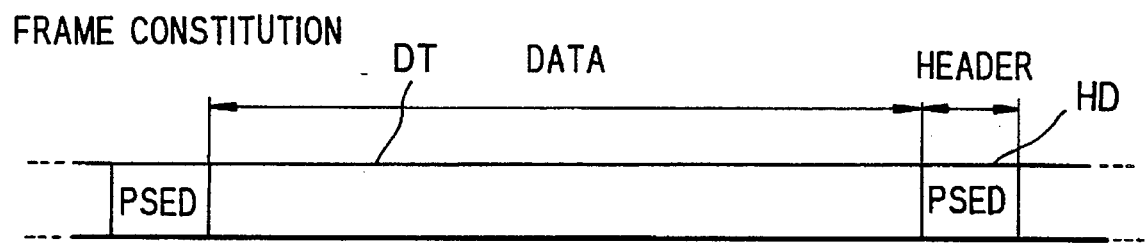
FIG. 8 is a diagram for describing the constitution of a frame.

FIG. 7 is a diagram showing the construction of the demultiplexing/multiplexing functional units and peripheral elements. The demultiplexing/multiplexing functional unit 14d includes a demultiplexer 21 for demultiplexing, frame by frame, the data that enters from the LAN interface 14a into data on a plurality of lines (i.e., demultiplexes the data into data constituting the smallest units of information) and then outputting the data. The demultiplexer 21 also adds prescribed control bits (a synchronizing flag, an effective-data flag, a synchronization-establishment flag and a line-disconnection flag) to the header portion of each frame and then transmits the frame. FIG. 8 is a diagram for describing the constitution of the frame. The frame is composed of a data portion DT and a four-bit header portion HD. The header portion HD is provided with a flag bit P indicative of synchronizing data, a flag bit S indicative of synchronization establishment, a flag bit E indicative of effective data and a flag bit D indicative of a disconnected line.

The unit 14d further includes a multiplexer 22 which, after detecting the control bits (effective-data flag, synchronization-establishment flag and line-disconnection flag) added on to the frame that has entered from the WAN via each line, removes the control bits, multiplexes each frame and sends the multiplexed frames to the LAN interface unit 14a. Also included are a synchronizing pattern generator 23 for sending a synchronizing pattern to lines designated at the time of initial connection between LANs, and a synchronizer 24 for detecting the synchronizing pattern or synchronizing flag and performing synchronization by absorbing the difference between the transmission delay quantities of the lines.

Figure 9:
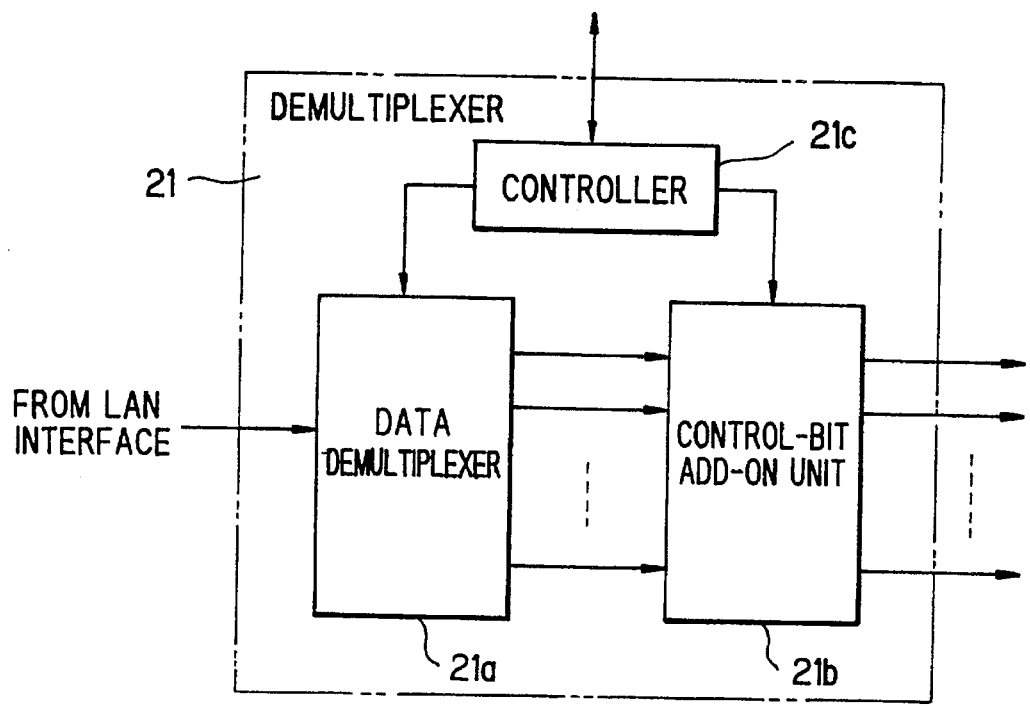
FIG. 9 is a diagram showing the construction of a demultiplexer.

FIG. 9 is a diagram showing the construction of the demultiplexer 21. The demultiplexer 21 includes a data demultiplexer 21a for demultiplexing, frame by frame, the data that enters from the LAN interface 14a into data on designated lines and then outputting the data, a control-bit add-on unit 21b for adding the prescribed control bits (the synchronizing flag P, effective-data flag E, synchronization-establishment flag S and line-disconnection flag D) onto the header portion of each frame and then transmitting the frame, and a controller 21c, which is connected to the line monitoring functional unit 14c, for inputting the line in use designated by the line monitoring functional unit to the data demultiplexer 21a and control-bit add-on unit 21c, and instructing the control-bit add-on unit 21b to add on the prescribed control bits.

Figure 10:
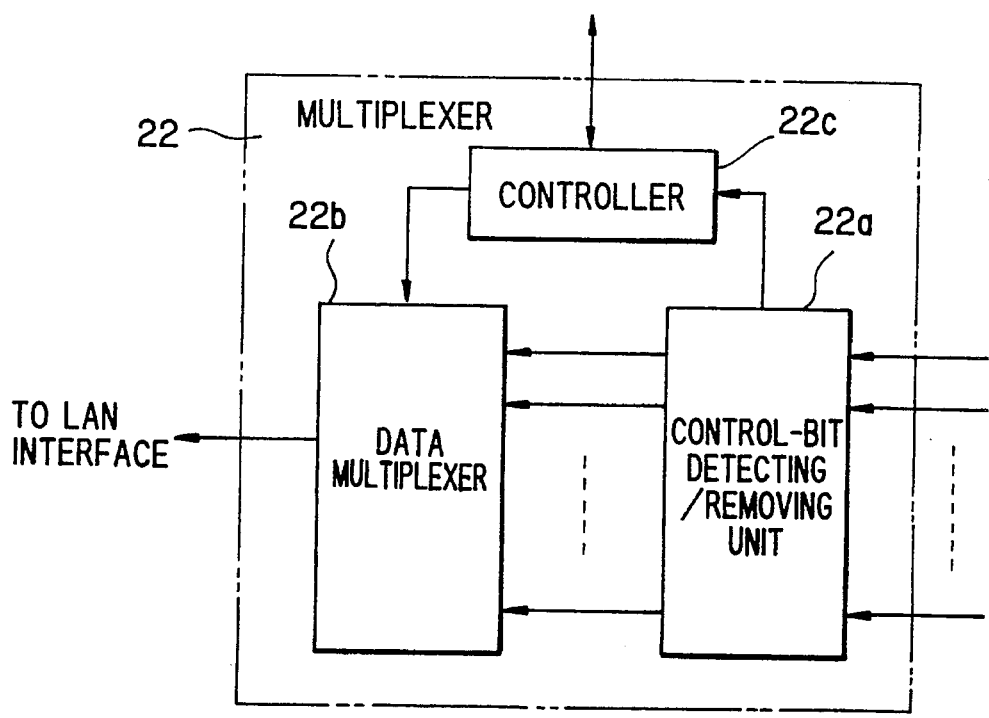
FIG. 10 is a diagram showing the construction of a multiplexer.

FIG. 10 is a diagram showing the construction of the multiplexer 22. The multiplexer 22 includes a control-bit detecting/removing unit 22a for detecting the control bits (the effective-data flag, synchronization-establishment flag and line-disconnection flag) added to the frames that have entered via each line, and for removing these control bits, a data multiplexer for multiplexing each frame and sending the multiplexed frames to the LAN interface 14a, and a controller 22c, which is connected to the line monitoring functional unit 14c, for inputting the line in use designated by the line monitoring functional unit to the control-bit detecting/removing unit 22a and the multiplexer 22b.

The LAN-to-LAN communication system of the present invention will now be described.

(b-6) Control for Increasing Band Based Upon Traffic

Figure 11:
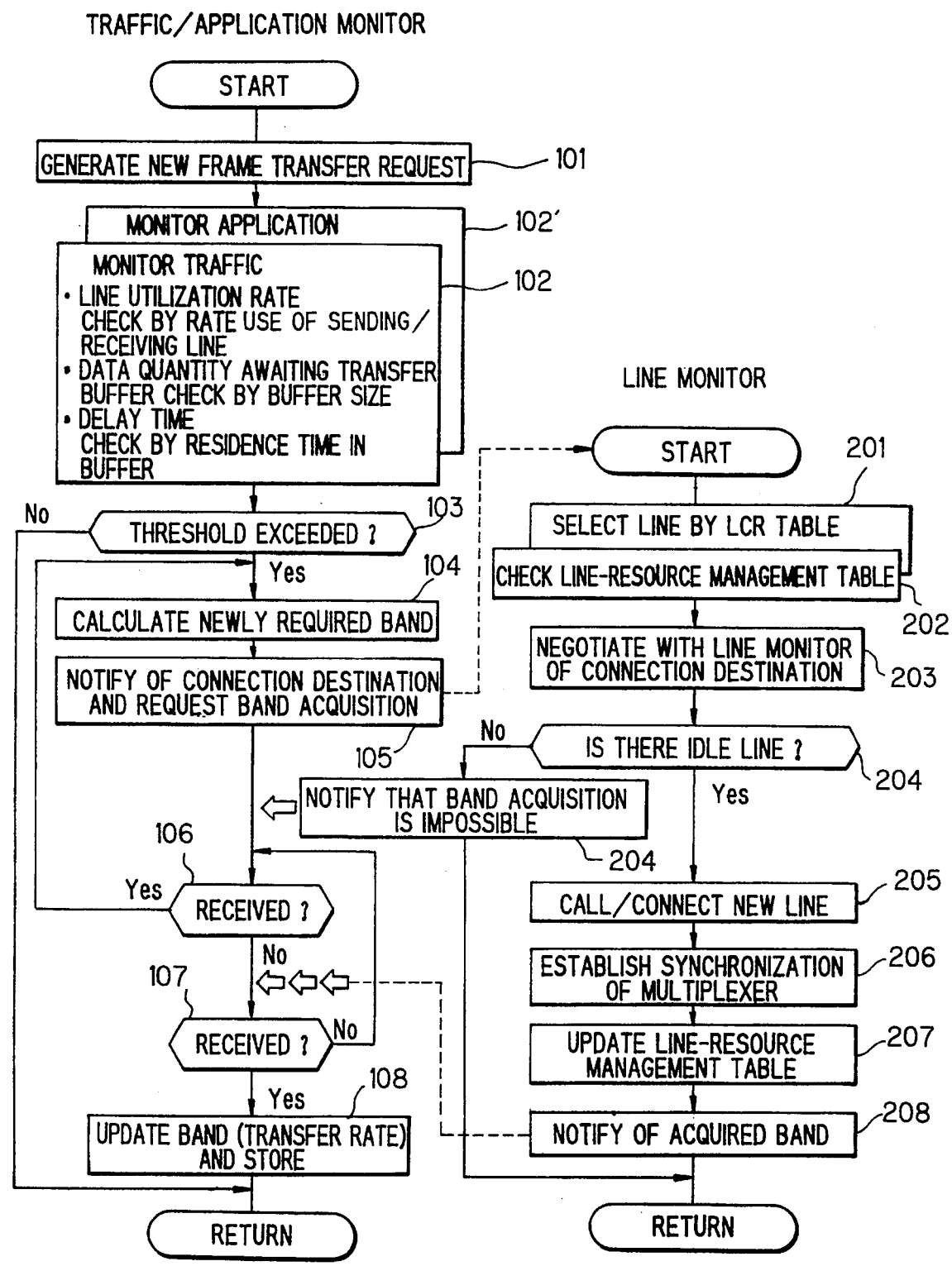
FIG. 11 is a flowchart showing processing for increasing a band.

FIG. 11 is a flowchart showing processing for performing LAN-to-LAN communication upon increasing a band (transfer rate). The 100 blocks represent processing executed by the traffic/application monitoring functional unit 14b, and the 200 blocks represent processing executed by the line monitoring functional units 14c.

When a request for transfer of a new frame is sent from the LAN 11 to another LAN (the LAN 12, for instance) via the WAN 13, the frame enters the routing functional unit 14a-3 via the LAN interface 14a-1 and the filtering functional unit 14a-2. At this time the routing functional unit 14a-3 notifies the traffic/application monitoring functional unit 14b of the fact that the request for transfer of the new frame has been issued. When the traffic/application monitoring functional unit 14b recognizes that the request for transfer of the new frame has been issued (step 101), the amount of traffic is obtained (step 102). The traffic is found using the quantity of data residing in a buffer that stores the communication data between the LANs 11 and 12 (namely the quantity of data present in the routing functional unit), or by using the length of time (delay time) data resides in the buffer, or by using line utilization rate. Line utilization rate $\eta$ can be obtained in accordance with the formula $\eta=100 \cdot f/Fi$ (%), where Fi (which is stored in the traffic/application monitoring functional unit) represents the band allocated to communication between the LANs 11, 12, and f represents the actual band in data communication.

Next, it is determined whether the traffic has exceeded a preset threshold value (step 103). If the threshold value is not exceeded, the allocated band is not increased, LAN-to-LAN communication is performed using the band Fi presently allocated, the program returns to the beginning and the traffic/application monitoring functional unit 14b waits for issuance of the next request for transfer of a new frame.

If the traffic has exceeded the threshold value, however, the required band f' is obtained from the table TL1 (see FIG. 4A) indicating the correspondence between traffic and required band (step 104). Next, the line monitoring functional unit 14c is notified of the connection destination and required band f' and a line-acquisition request is issued (step 105). Thereafter, the traffic/application monitoring functional unit 14b waits for notification, from the line monitoring functional unit 14c, of the fact that band acquisition is impossible or of the acquired band (steps 106, 107).

When there is a request for band acquisition, the line monitoring functional unit 14c refers to the LCR table (see FIG. 5) to decide the optimum line type and number of lines taking speed and economy into account (step 201). For example, a contracted line for which the tariff is low is selected based upon the connection destination and the type and number of lines are decided based upon the required band. If each line is a 64 Kbps narrow-band line and the required band is 256 Kbps, then four narrow-band lines will be required. Thus, if, for example, N-number of 64 Kbps lines are used and bundled together thickly to connect the LANs and traffic (the required band) becomes large, the number of lines bundled is increased further to thicken the bundle. If the traffic (the required band) becomes small, the number of bundled lines is reduced to make the bundle slender.

Next, the line monitoring unit refers to the line-resource management table LRTB (FIG. 6) to determine whether any of the necessary number of lines is idle (step 202). Thereafter, the line monitoring functional unit negotiates with the line monitoring functional unit 15c of the connection destination and determines whether there are any idle lines in the necessary number of lines of the other party as well (step 203).

If there are not any necessary number of idle lines, the traffic/application monitoring functional unit 14b is notified of the fact that band acquisition is not possible (step 204), the program returns to the beginning and the line monitoring functional unit 14c waits for the next request for band acquisition. Upon being notified of the fact that band acquisition is not possible, the traffic/application monitoring functional unit 14b reduces the required band (step 104) and outputs this to the line monitoring functional unit 14c (step 105). The latter executes the processing of steps 201–203 and the above-described processing is repeated until necessary number of idle lines are found.

If the necessary number of idle lines are found, the line monitoring functional unit decides a new additional line (WAN interface), calls the other party's WAN interface using the decided WAN interface and connects the lines (step 205). When the additional line is connected, the line monitoring functional unit 14c controls the demultiplexing/multiplexing functional unit 14d to establish synchronization between the line already being used LAN-to-LAN communication and the additional line (step 206). The details of synchronization establishment will be described later.

Next, the prescribed subject matter is entered in the items corresponding to the above-mentioned WAN interface in the line-resource management table LRTB (step 207), the traffic/application monitoring functional unit 14b is notified of the acquired band f' (step 208), the program returns to the beginning and the line monitoring functional unit waits for acquisition of the next band.

Upon being notified of the acquired band, the traffic/application monitoring functional unit 14b updates the allocated band Fi by the following formula (step 108):

$$Fi+f' \rightarrow Fi$$

the program returns to the beginning and the traffic/application monitoring functional unit waits for issuance of a request for transmission of a new frame.

The foregoing relates to band-increase control in a case where transfer of a new frame is requested. The processing from step 102 onward is executed periodically and control is performed so as increase the band when the traffic increases and exceeds the threshold value.

(b-7) Control for Increasing Band Based Upon Type of Application

The foregoing relates to a case in which band is controlled based upon traffic. However, band can be controlled based upon the type of application as well. More specifically, upon recognizing that a request for transfer of a new frame has been issued (step 101), the traffic/application monitoring functional unit 14b identifies the type of application of the LAN terminal from the port number added on to the header portion of the frame (step 102'). The unit 14b then obtains the required band from the table TL2 (see FIG. 4B) (step 104) and sends the line monitoring functional unit 14c the line-acquisition request (step 105). Thereafter, processing (from step 201 onward) similar to that for controlling the increase in the band based upon traffic is executed.

In case of a low-speed application (TELNET, for example), processing (from step 102 onward) similar to that for controlling the increase in the band based upon traffic is executed after execution of the processing of step 102'. In case of a high-speed application (FTP, for example) such as file transfer, the program jumps directly from step 102' to step 104 so that the required band can be obtained from the table TL2 and the band-acquisition request issued.

In a case where a high-speed application such as file transfer is identified in control for increasing the band based upon the type of application, the required band is made 768 Kbps (which corresponds to 10~14 lines of 64 Kbps each) and this band is assigned, after which the band (the number of lines) is increased or decreased to bring it to the proper value. If this expedient is adopted, the fact that effectiveness in terms of communication cost is achieved is obtained by simulation.

(b-8) Control for Reducing Band

Figure 12:
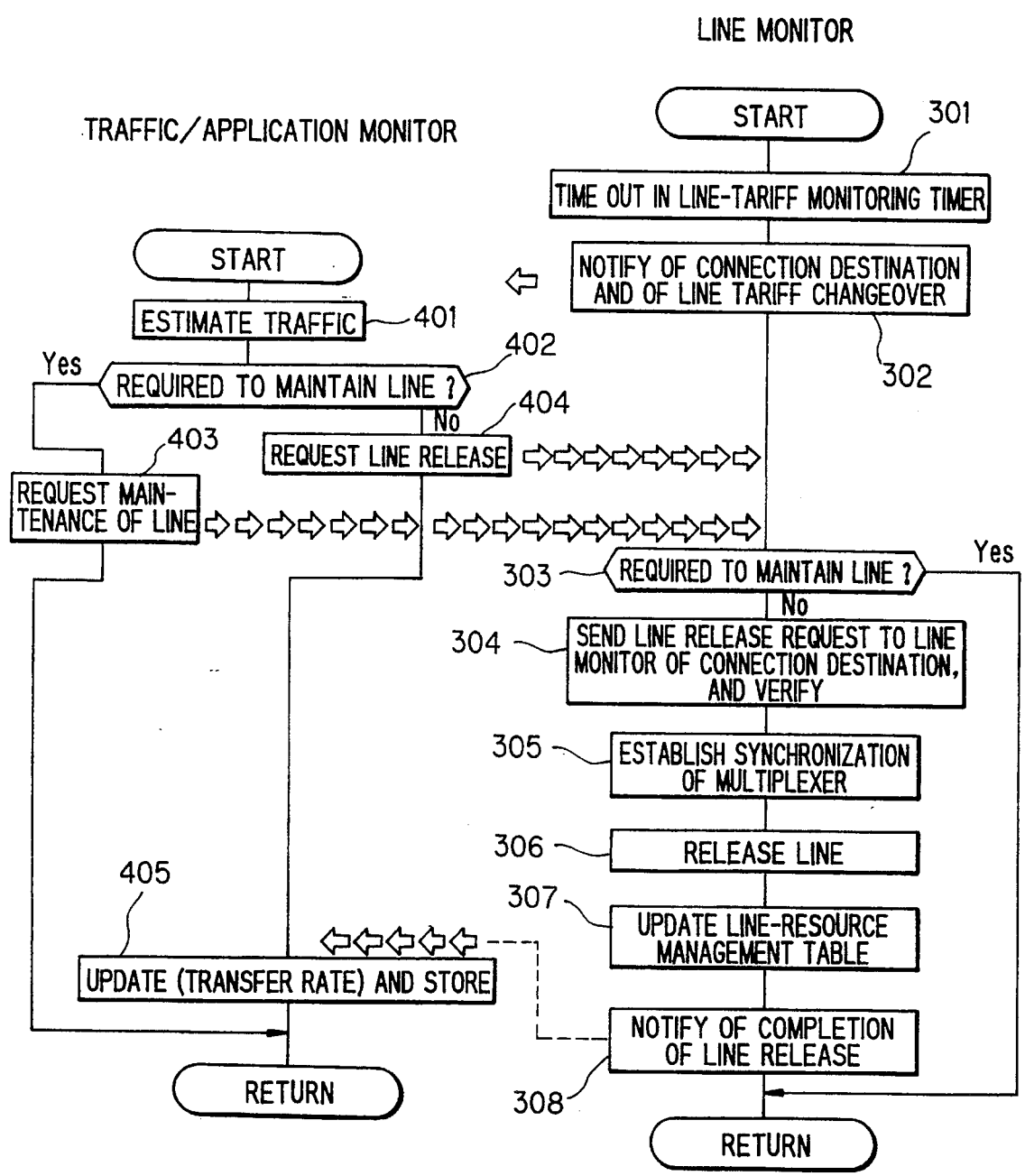
FIG. 12 is a flowchart showing processing for decreasing a band.

FIG. 12 is a flowchart showing processing for performing LAN-to-LAN communication upon decreasing the band (transfer rate). The 300 blocks represent processing executed by the line monitoring functional unit 14c, and the 400 blocks represent processing executed by the traffic/application monitoring functional unit 14b.

Figure 6:
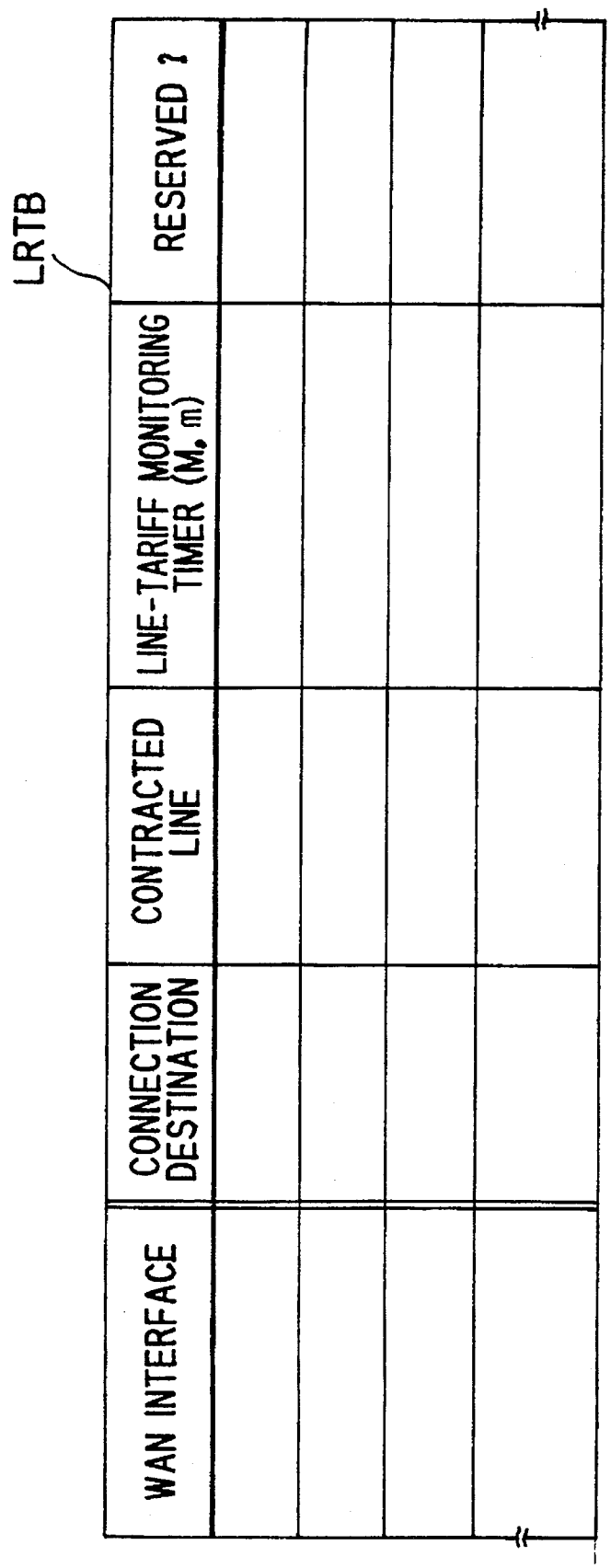
FIG. 6 is a diagram for describing a line-resource management table.

The line monitoring functional unit 14c has a line-tariff monitoring timer, for each WAN interface, in the line-resource management table LRTB (FIG. 6). Each timer monitors the time the line is in use. More specifically, if the line user's fee is added up every three minutes, the line-tariff monitoring timer will hold the number of times (M) three minutes has elapsed as well as elapsed time (m) up to three minutes.

When a prescribed time is attained just prior to the moment m in the line-tariff monitoring timer of each WAN interface reaches three minutes, the line monitoring functional unit 14c regards this as representing the expiration of time in the timer (step 301) and notifies the traffic/application monitoring functional unit 14b of the connection destination and of the fact that the line tariff will be incremented (step 302). The line monitoring functional unit 14c then waits for a line-disconnection request or a line-maintenance request from the traffic/application monitoring functional unit 14b.

Upon receiving notification of the fact that the line tariff will be incremented, the traffic/application monitoring functional unit 14b estimates the present traffic in LAN-to-LAN communication with regard to the connection destination (step 401) and, on the basis of the traffic, decides whether the present line is to be maintained or not (step 402). If the traffic is appropriate, the traffic/application monitoring functional unit 14b sends the line monitoring functional unit 14c a line-maintenance request (step 403), after which it awaits notification of the next increment in line tariff. If the traffic is light, however, this means that too large a band has been allocated. Accordingly, the line monitoring functional unit 14c is notified of a request for line release (step 404), after which the traffic/application monitoring functional unit 14b awaits notification of completion of line release from the line monitoring functional unit 14c.

The line monitoring functional unit 14c determines whether line maintenance has been requested (step 303) based upon notification from the traffic/application monitoring functional unit 14b. When it is required that a line be maintained, the summing of time in use performed by the line-tariff timer continues and the program returns to the beginning to monitor the next event of time expiration in the timers.

In a case where notification is given for request of line release, the line-release request is issued by negotiation with the line monitoring functional unit 15c of the connection destination. If the verification which shows receipt of the line-release request is received from the unit 15c (step 304), the line monitoring functional unit 14c controls the demultiplexing/multiplexing functional unit 14d to establish synchronization (step 305) and releases the line that is to be disconnected (step 306). The details of processing for synchronization establishment and line release at the time of line disconnection will be described later. It should be noted that an arrangement may be adopted in which the traffic/application monitoring functional unit 14b decides the number of lines to be released by taking into account the traffic and the presently assigned band Fi, and the line monitoring functional unit 14c decides this number of lines to be released and then releases the lines. Alternatively, an arrangement may be adopted in which only the lines connected to WAN interfaces for which time has expired are released.

Next, the line monitoring function unit 14c updates the line-resource management table LRTB (step 307), subsequently notifies the traffic/application monitoring functional unit 14b of completion of line release (step 308) and monitors for the next time-expiration event.

Upon receiving notification of completion of line release, the traffic/application monitoring functional unit 14b uses a release band f" contained in the notification to update the assigned band Fi according to Fi–f"→Fi (step 405) and then waits for notification of the next increment in line tariff.

(b-9) Maintenance of Virtual Circuit in Line Switching

Traffic increases in the file transfer application when a file transfer is performed but decreases when a command such a directory-search command is executed. In such an application, there are instances where traffic increases at certain times, decreases for an interval of time and then increases again. If traffic decreases and the band is narrowed (lines are released) in such cases, lines will be busy when traffic increases again and it becomes necessary to widen the band. As a consequence, a situation may result in which lines cannot be acquired. This can lead to a decline in performance.

Accordingly, when traffic diminishes and lines are released, the line monitoring functional unit 14c negotiates with the line monitoring functional unit 15c of the other party at step 304 and maintains at least one line as a virtual circuit. In other words, the line monitoring functional unit 15c enters the number of the originating WAN interface in the reservation section (the line-resource management table LRTB) that corresponds to the WAN interface at the connection destination of the line to be maintained and the line monitoring functional unit 14c enters a reservation in the reservation section (the line-resource management table LRTB) that corresponds to the originating WAN interface of the maintained line. As a result, the WAN interface (line) of the connection destination will appear to be busy and will no longer be usable in communication with other LANs. However, the line can be connected when the originating WAN interface that has been entered in the reservation section places a call to the WAN interface at the connection destination.

By thus reserving a line, the line can be acquired even when there is a recurrence of an increase in traffic. This makes it possible to achieve good performance and to start up data transmission smoothly. Furthermore, the number of lines reserved is not limited to one.

(b-10) Control for Synchronization at Time of Initial Connection

Figure 13:
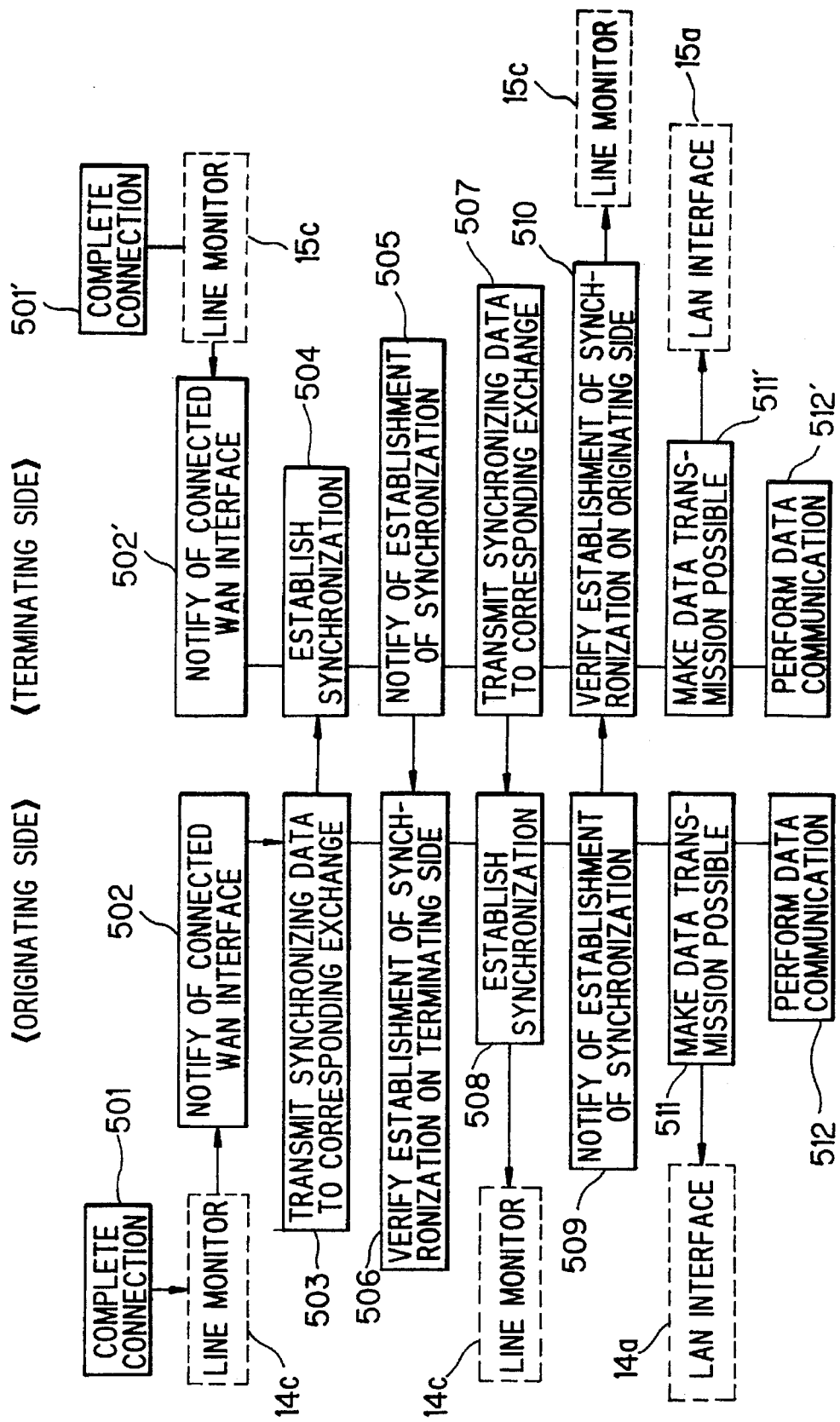
FIG. 13 is a flowchart showing processing for synchronization at the time of initial connection.

FIG. 13 is a flowchart showing processing for synchronization at the time of initial connection. It should be noted that the expression "time of initial connection" refers to a time at which a line is connected between LANs under circumstances in which not even a single is currently interconnecting the LANs.

When connection of a plurality of new lines is completed at step 205 in FIG. 11 (steps 501,501'), the line monitoring units 14c, 15c notify of the WAN interfaces connected to the demultiplexing/multiplexing functional units 14d, 15d, respectively (steps 502, 502'). As a result, the demultiplexing/multiplexing functional unit 14d on the originating side inputs the synchronizing pattern to the above-mentioned WAN interfaces, of which notification has been given, from the synchronous pattern generator 23 (FIG. 7) simultaneously and transmits the pattern to the terminating side (step 503). The synchronizing unit 24 in the demultiplexing/multiplexing functional unit 15d on the terminating side absorbs a difference in delay time using the synchronizing pattern that has entered via the WAN interfaces of which notification has been given and arranges it so that the data enters the multiplexing unit 22 simultaneously from each line. Thus, if synchronization is established (step 504), the originating side is so notified (step 505), whereby the originating side verifies that the synchronization has been established on the terminating side (506).

Further, the demultiplexing/multiplexing functional unit 15d on the terminating side inputs the synchronizing pattern to the WAN interfaces, of which notification has already been given, from the synchronous pattern generator 23 simultaneously and transmits the pattern to the originating side (step 507). The synchronizing unit 24 in the demultiplexing/multiplexing functional unit 14d on the originating side performs synchronization using the synchronizing pattern that has entered via the WAN interfaces of which notification has already been given. Thus, if synchronization is established, the line monitoring functional unit 14c and the terminating side are so notified (steps 508, 509), whereby the terminating side verifies that the synchronization has been established on the originating side (510) and notifies the line monitoring functional unit 15c.

By virtue of the foregoing operation, the line monitoring functional units 14c, 15c notify the LAN interfaces 14a, 15a of the fact that data transmission is possible (steps 511,511'), after which data communication begins (steps 512, 512').

(b-11) Control for Data Transfer When Lines are Increased

Figure 14:
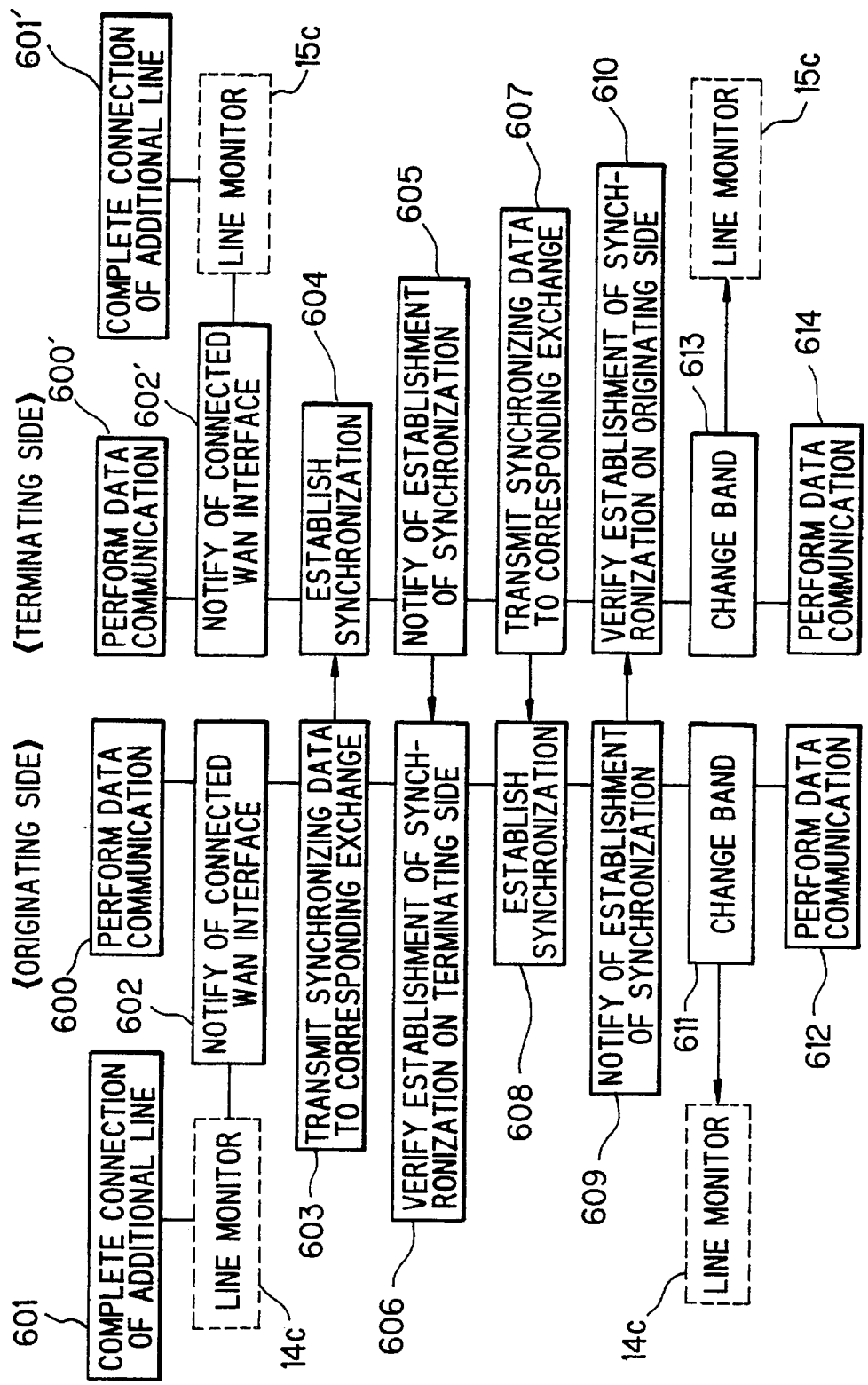
FIG. 14 is a flowchart showing processing for data transfer when lines are increased.

FIG. 14 is a flowchart showing processing for data transfer when lines are increased, and FIG. 15 is a diagram for describing synchronizing and data transfer processing executed when lines are increased.

When connection of an additional line is completed at step 205 in FIG. 11 (steps 601,601' in FIG. 14) during data communication (steps 600, 600'), the line monitoring units 14c, 15c give notification of the WAN interfaces connected to the demultiplexing/multiplexing functional units 14d, 15d, respectively (steps 602, 602').

Figures 15A, 15B, 15C:
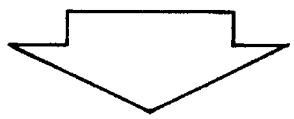
FIGS. 15A, 15B and 15C illustrate the contents of flag data transferred to a receiving side from a transmitting side up to establishment of synchronization.

As a result, the demultiplexer 21 of the demultiplexing/multiplexing functional unit 14d on the originating side performs the following operations:

① transmits the data frame of one line (#1 in FIG. 15) used thus far in LAN-to-LAN communication upon setting the synchronizing-reference flag P, the synchronization-establishment flag S and the effective-data flag E of this data frame to "1";

② transmits the data frames of other lines (#2, #3) used thus far in LAN-to-LAN communication upon setting only the synchronization-establishment flag S and the effective-data flag E of this data frame to "1"; and ③ at the same time, transmits data frames identical with the data frame of line #1 via the additional lines (#4, #5) (see FIG. 15A).

The synchronizer 24 in the demultiplexing/multiplexing functional unit 15d on the terminating side detects the synchronizing flag P and synchronizes line #1 with the additional lines #4, #5 (step 604). The data frame of each line is sent to the multiplexer 22, where only the data frames (#1–#3) of the lines used thus far in LAN-to-LAN communication are multiplexed, restored to their original form and fed into the LAN interface 15a.

When synchronization is established, the synchronizer 24 on the terminating side so informs the demultiplexer 21. As a result, the demultiplexer 21 sends frames for which the synchronization-establishment flag S has been made "1" to the originating side via the lines #1–#5 to notify of establishment of synchronization (step 605). The synchronizer 24 on the originating side detects the synchronization-establishment flag S from the frames of lines #1–#5, whereby the terminating side verifies that synchronization has been established (step 606).

Through an operation similar to that described above, the demultiplexer 21 of the demultiplexing/multiplexing functional unit 15d on the terminating side sends frames for which the synchronizing flag P has been made "1" to the originating side via the lines #1, #4, #5 to thereby establish synchronization (steps 607, 608).

When synchronization is established, the synchronizer 24 on the originating side so notifies the demultiplexer 21. As a result, the demultiplexer 21 performs the following operations:

① transmits data frames for which the synchronization-establishment flag S and effective-data flag E of lines #1–#3 have both been made "1", and ② transmits the frames of lines #4, #5 to the terminating side upon making only the synchronization-establishment flag S "1" (see FIG. 15B).

The synchronizer on the terminating side detects the synchronization-establishment flag S from the frames of lines #1–#5, whereby the originating side verifies that synchronization has been established (step 610).

Thereafter, the demultiplexer 21 on the originating side changes over the lines from #1–#3 to #1–#5 and notifies the line monitoring functional unit 14c of the changeover (step 611). The data that enters from the LAN interface 14a is demultiplexed into data on lines #1–#5, the synchronization-establishment flag S and effective-data flag E of each frame are both made "1", the frames are sent to the corresponding WAN interfaces and are transmitted to the corresponding exchange via the WAN (step 612; see FIG. 15C).

The multiplexer 22 on the terminating side detects S="1", E="1" from the frames on lines #1–#5, changes over the lines from #1–#3 to #1–#5 and notifies the line monitoring functional unit 15c of the changeover (step 613). After the control bits are removed from data that enters from the lines #1–#5, the data is multiplexed and enters the LAN interface 15a (step 614).

(b-12) Control for Data Transfer When Lines Are Decreased

Figure 16:
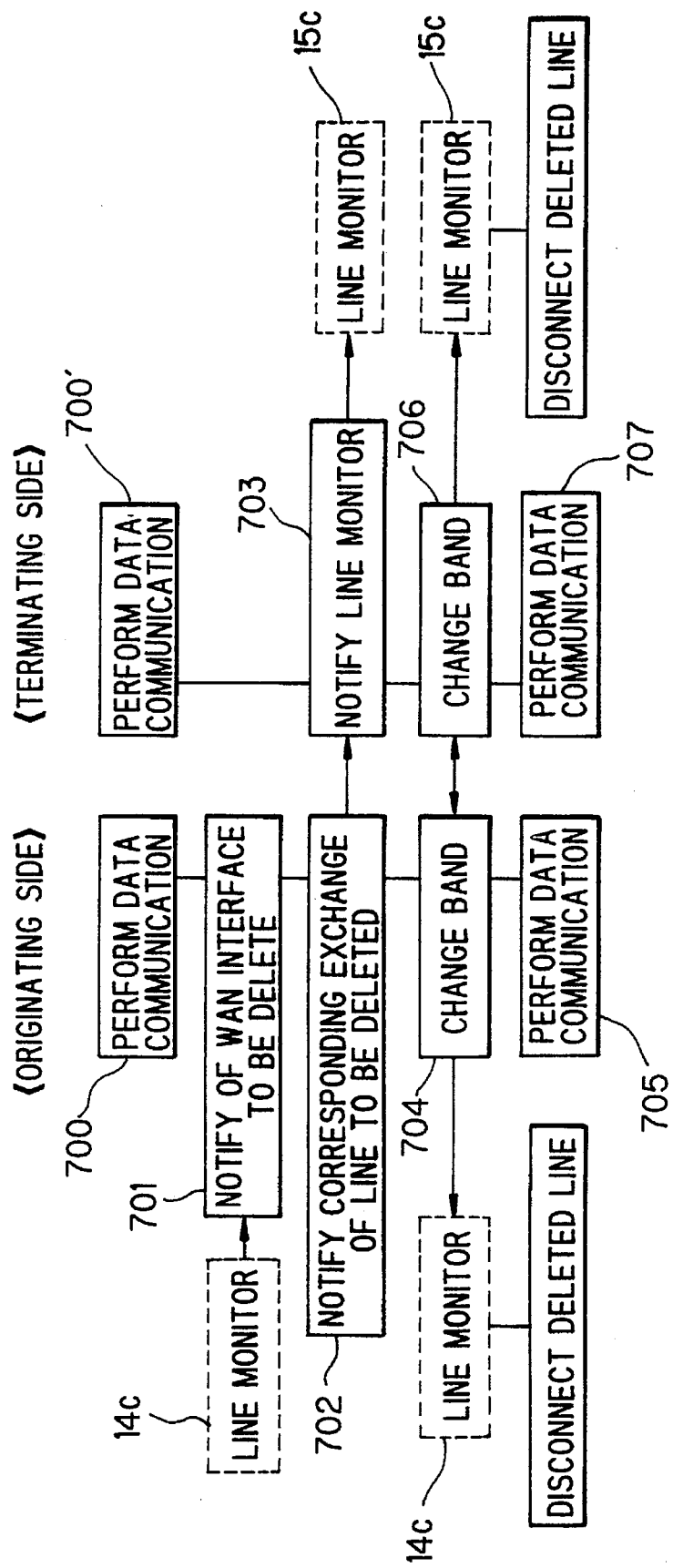
FIG. 16 is a flowchart illustrating data transfer processing executed when lines are reduced.

FIG. 16 is a flowchart showing processing for data transfer when lines are decreased, and FIG. 17 is a diagram for describing synchronizing and data transfer processing executed when lines are decreased.

When it becomes necessary to reduce lines and the lines (WAN interfaces) to be reduced are decided during data communication (steps 700, 700'), the line monitoring functional unit 14c notifies the demultiplexing/multiplexing functional unit 14d of the WAN interfaces to be deleted (step 701).

Next, the demultiplexer 21 ① transmits the data frames, which are transmitted via the lines to be disconnected (#4–#5 in FIG. 17), upon setting the synchronization-establishment flag S, the effective-data flag E and the line-disconnection flag D of these data frames to "1", and ② transmits the data frames, which are transmitted via the lines not to be disconnected (#1 –#3), upon setting only the synchronization-establishment flag S and the effective-data flag E of these data frames to "1" (step 702) (see FIG. 17A).

The synchronizer 24 on the terminating side detects the line-disconnection flag D="1" from the frames of lines #4, #5, thereby recognizing the lines #4, #5 to be deleted, and so notifies the line monitoring functional unit 15c (step 703).

Thereafter, the demultiplexer 21 on the originating side changes over the lines from #1–#5 to #1–#3, notifies the line monitoring functional unit 14c of the changeover (step 704), demultiplexes the data that enters from the LAN interface 14a into data on the lines #1–#3, makes both the synchronization-establishment flag S and effective-data flag E of each frame "1", sends the frames to the corresponding WAN interfaces and transmits them to the corresponding exchange via the WAN (step 705; see FIG. 17C).

The multiplexer 22 on the terminating side detects S="1", E="1" from the frames on lines #1–#3 but not from lines #4, #5, thereby changing over the lines from #1–#5 to #1–#3, and notifies the line monitoring functional unit 15c of the changeover (step 706). After the control bits are removed from frames that enter from the lines #1–#3, the data is multiplexed, returned to the original form and fed into the LAN interface 15a (step 707).

In actuality, as shown in FIG. 17B, frames for which the synchronization-establishment flag S and line-disconnection flag D have both been made "1" are transmitted from the originating side to the terminating side via the lines #4, #5 before lines are disconnected, after which the synchronization-establishment flag S and line-disconnection flag D are made "0", as illustrated in FIG. 17C.

Thus, in accordance with the present invention, allocated band is increased in dependence upon traffic or type of application, as a result of which data can be transferred at high speed. To the user, it is just as if communication is being performed within a single LAN without the intermediary of a WAN. Further, a table is provided for storing the types of optimum lines or the number of lines in conformity with the allocated band, and the table is referred to in order to decide the types of lines or the number of lines. This makes possible economical communication.

Furthermore, in accordance with the present invention, the number of lines used in communication between LANs is increased in conformity with the traffic or type of application, transferred data is transmitted upon being demultiplexed into data on each line, and frames sent via the lines are multiplexed on the receiving side and then sent out to the corresponding LAN. As a result of this arrangement, even though the lines are narrow-band lines, the number of lines bundled is controlled, thereby making it possible to control the allocated band from the narrow-band to the wide-band region.

In a case where the number of lines is increased dynamically during communication, synchronization between lines is necessary. However, rather than a synchronizing pattern being passed, a synchronizing flag or an effective-data flag is added on to the data frames and is transmitted to achieve synchronization. As a result, even if the number of lines increases during data communication, synchronization of the data among a number of lines can be carried without a momentary interruption in the data transfer. This makes it possible to perform a data transfer continuously without a decline in communication efficiency or a decline in reliability.

Furthermore, in accordance with the present invention, a table is provided for storing data indicating, for each line (each of the WAN interfaces), whether the line is idle or not. In a case where not enough idle lines for satisfying the required band exist, the required band is reduced and data communication is performed using the idle lines. This makes possible optimum LAN-to-LAN communication conforming to the existing conditions.

Furthermore, in accordance with the present invention, traffic between LANs is monitored during communication and, on the basis of the traffic monitored, it is decided whether to decrease, maintain or increase the number of lines presently in use. In a case where it is required to decrease the number of lines, the lines that are unnecessary are disconnected. As a result, economical LAN-to-LAN communication commensurate with traffic can be performed while maintaining high-speed communication.

Furthermore, in accordance with the present invention, a line-tariff monitoring timer is provided for each line. The traffic is determined and the decision to disconnect or maintain lines is made before the line-tariff monitoring timer runs out of time, i.e., immediately before the line user fee increases. This makes it possible economical LAN-to-LAN communication.

Furthermore, in accordance with the present invention, if the number of lines is reduced, data that will be transmitted via a line to be disconnected is transmitted upon having a line-disconnection flag set for it. Data that will be transmitted via other lines that will not be disconnected is transmitted without having a line-disconnection flag set for it. The receiving side recognizes the disconnected line by the line-disconnection flag, after which it multiplexes and transmits the data sent to it via the lines from which the disconnected line has been excluded. As a result, even if the number of lines is reduced during data communication, there will be no interruption in data transfer accompanying line disconnection. This makes it possible to transfer data in continuous fashion.

Furthermore, in accordance with the present invention, if a line is disconnected, at least one line is reserved and is not used in communication with other LANs. When it becomes necessary to widen the band, the reserved line is used. As a result, it is possible to avoid a situation in which a line cannot be acquired because it is busy. In addition, start-up of data transmission can be performed smoothly.

As many apparently widely different embodiments of the present invention can be made without departing from the spirit and scope thereof, it is to be understood that the invention is not limited to the specific embodiments thereof except as defined in the appended claims.

What is claimed is:

1. A LAN-WAN-LAN communication method in a LAN-WAN-LAN connecting apparatus, for performing communication between a local area network (LAN) on a transmitting side and a local area network (LAN) on a receiving side via a wide area network (WAN) within limits of a band allocated by said apparatus, the method comprising the steps of:

demultiplexing a frame, which has been received from the LAN on the transmitting side, into data constituting smallest units of information, and transmitting this data via a plurality of lines;

multiplexing data, which is sent to the receiving side via each line, on the receiving side so as to generate a frame and sending the generated frame to the LAN on the receiving side;

obtaining traffic between the LAN on the transmitting side and the LAN on the receiving side when a request for transfer of a new frame has been issued from a terminal which is connected to the LAN on the transmitting side;

obtaining a band required for the transfer of the new frame on the basis of the traffic;

performing communication upon increasing the number of lines used in LAN-WAN-LAN communication in such a manner that the band obtained in said band obtaining step is satisfied;

providing a table for storing a list of idle lines;

investigating whether a sufficient number of idle lines that satisfy the obtained band are available;

reducing a band to obtain a new band in the absence of the sufficient number of idle lines that satisfy the obtained band; and increasing the number of lines to be used in said communication so as to satisfy the new band.

2. A LAN-WAN-LAN communication method in a LAN-WAN-LAN connecting apparatus, for performing communication between a local area network (LAN) on a transmitting side and a local area network (LAN) on a receiving side via a wide area network (WAN) within limits of a band allocated by said apparatus, the method comprising the steps of:

demultiplexing a frame, which has been received from the LAN on the transmitting side, into data constituting smallest units of information, and transmitting this data via a plurality of lines;

multiplexing data, which is sent to the receiving side via each line, on the receiving side so as to generate a frame and sending the generated frame to the LAN on the receiving side;

obtaining traffic between the LAN on the transmitting side and the LAN on the receiving side when a request for transfer of a new frame has been issued from a terminal which is connected to the LAN on the transmitting side;

obtaining a band required for the transfer of the new frame on the basis of the traffic;

performing communication upon increasing the number of lines used in LAN-WAN-LAN communication in such a manner that the band obtained in said band obtaining step is satisfied;

transmitting a synchronizing pattern to all lines used on the transmitting side at an initial connection between LANs;

receiving the synchronizing pattern and performing synchronization of each line on the receiving side and notifying the transmitting side of establishment of synchronization;

after synchronization is established, demultiplexing data, which has been accepted from the LAN on the transmitting side, into data constituting smallest units of information, and transmitting this data to the receiving side via each of the lines used; and on the receiving side, multiplexing data, which is sent to the receiving side via each line and sending the multiplexed data to the LAN on the receiving side.

3. A LAN-WAN-LAN communication method in a LAN-WAN-LAN connecting apparatus, for performing communication between a local area network (LAN) on a transmitting side and a local area network (LAN) on a receiving side via a wide area network (WAN) within limits of a band allocated by the LAN-WAN-LAN connecting apparatus, the method comprising the steps of:

demultiplexing a frame, which has been received from the LAN on the transmitting side, into data constituting smallest units of information, and transmitting this data via a plurality of lines;

multiplexing data, which is sent to the receiving side via each line, on the receiving side so as to generate a frame and sending the generated frame to the LAN on the receiving side;

obtaining traffic between the LAN on the transmitting side and the LAN on the receiving side when a request for transfer of a new frame has been issued from a terminal which is connected to the LAN on the transmitting side;

obtaining a band required for the transfer of the new frame on the basis of the traffic;

increasing the number of lines used in LAN-WAN-WAN communication in such a manner that the band obtained is satisfied;

in a case where the number of lines is increased, transmitting data on at least one line thus far in communication between LANs upon setting a synchronizing flag in the data, and transmitting data for which said synchronizing flag has been set on an additional line used in communication between LANs;

before synchronization is established, on the receiving side, multiplexing only the data on lines used thus far in communication between LANs, sending the multiplexed data to the LAN on the receiving side, synchronizing lines for which synchronizing flags have been detected and notifying the transmitting side of establishment of synchronization;

after synchronization is established, and on the transmitting side, demultiplexing data accepted from the LAN on the transmitting side into data constituting smallest units of information, and transmitting this data to the receiving side via the lines used thus far as well as the additional line; and on the receiving side, multiplexing data sent to the receiving side via each line and sending this multiplexed data to the LAN on the receiving side.

4. A LAN-WAN-LAN communication method in a LAN-WAN-LAN connecting apparatus, for performing communication between a local area network (LAN) on a transmitting side and a local area network (LAN) on a receiving side via a wide area network (WAN) within limits of a band allocated by said apparatus, the method comprising the steps of:

demultiplexing a frame, which has been received from the LAN on the transmitting side, into data constituting smallest units of information, and transmitting this data via a plurality of lines;

multiplexing data, which is sent to the receiving side via each line, on the receiving side so as to generate a frame and sending the generated frame to the LAN on the receiving side;

monitoring traffic between LANs;

obtaining a band required for communication between LANs, based upon monitored traffic;

performing communication upon increasing, decreasing or maintaining the number of lines, which are used in communication between LANs, based upon the obtained band;

in a case where the number of lines is increased, transmitting data on at least one line used thus far in communication between LANs upon setting a synchronizing flag in the data, and transmitting data for which said synchronizing flag has been set on an additional line used in communication between LANs;

before synchronization is established, on the receiving side, multiplexing only the data on lines used thus far in communication between LANs, sending the multiplexed data to the LAN on the receiving side, synchronizing lines for which synchronizing flags have been detected and notifying the transmitting side of establishment of synchronization;

after synchronization is established, on the transmitting side, demultiplexing data accepted from the LAN on the transmitting side into data constituting smallest units of information, and transmitting this data to the receiving side via the lines used thus far as well as the additional line; and on the receiving side, multiplexing data sent to the receiving side via each line and sending this multiplexed data to the LAN on the receiving side.

5. A LAN-WAN-LAN communication method in a LAN-WAN-LAN connecting apparatus, for performing communication between a local area network (LAN) on a transmitting side and a local area network (LAN) on a receiving side via a wide area network (WAN) within limits of a band allocated by said apparatus, the method comprising the steps of:

demultiplexing a frame, which has been received from the LAN on the transmitting side, into data constituting smallest units of information, and transmitting this data via a plurality of lines;

multiplexing data, which is sent to the receiving side via each line, on the receiving side so as to generate a frame and sending the generated frame to the LAN on the receiving side;

monitoring traffic between LANs;

obtaining a band required for communication between LANs based upon monitored traffic;

performing communication upon increasing, decreasing or maintaining the number of lines, which are used in communication between LANs, based upon the obtained band;

in a case where the number of lines is decreased, and on the transmitting side, transmitting data, on a line to be disconnected, to the receiving side upon setting a line-disconnection flag in the data, and transmitting data on other lines without setting a line-disconnection flag in the data; and on the receiving side, recognizing said line to be disconnected by detecting the line-disconnection flag, and thenceforth multiplexing data sent to the receiving side via lines other than the line to be disconnected and sending this multiplexed data to the LAN on the receiving side.

6. A LAN-WAN connecting apparatus in a communication system for allocating a band within which communication between a local area network (LAN) on a transmitting side and a LAN on a receiving side via a wide area network (WAN) is performed and performing said communication between LANs within limits of the allocated band, the apparatus comprising:

a demultiplexer and multiplexer means for demultiplexing a frame, which has been accepted from the LAN on the transmitting side, into data constituting smallest units of information, transmitting this data to a plurality of lines, multiplexing data, which is sent to the receiving side via each line so as to generate a frame, and sending the generated frame to the LAN on the receiving side;

means for obtaining traffic between the LAN on the transmitting side and the LAN on the receiving side when a request for transfer of a new frame has been issued from a terminal which is connected to the LAN on the transmitting side;

band calculating means for obtaining a band required for the transfer of the new frame on the basis of the traffic; and line increasing means for increasing the number of lines used in LAN-WAN-LAN communication in such a manner that the band obtained is satisfied.

7. A LAN-WAN connecting apparatus in a communication system for allocating a band within which communication between a local area network (LAN) on a transmitting side and a LAN on a receiving side via a wide area network (WAN) is performed and performing the communication between LANS within limits of the allocated band, the apparatus comprising:

a demultiplexer and multiplexer means for demultiplexing a frame, which has been accepted from the LAN on the transmitting side, into data constituting smallest units of information, transmitting this data to a plurality of lines, multiplexing data, which is sent to the receiving side via each line so as to generate a frame, and sending the generated frame to the LAN on the receiving side;

monitoring means for monitoring traffic between LANs;

band calculating means for obtaining a band required for communication between LANs based upon the traffic; and line increasing and decreasing means for increasing, decreasing or maintaining the number of lines, which are used in communication between LANs, based upon the band obtained, wherein said demultiplexer and multiplexer comprises:

means which, in a case where the number of lines is increased, is for transmitting data on at least one line used thus far in communication between LANs upon setting a synchronizing flag in the data, and transmitting data for which said synchronizing flag has been set on an additional line used in communication between LANs; and demultiplexing means which, after synchronization is established, is for demultiplexing data accepted from the LAN on the transmitting side and transmitting this data to the receiving side via the lines used thus far as well as the additional line.

8. The apparatus according to claim 7, wherein said demultiplexer and multiplexer means comprises:

means which, before synchronization is established, is for multiplexing only the data on lines used thus far in communication between LANs, sending the multiplexed data to the LAN on the receiving side, synchronizing lines for which said synchronizing flags have been detected and notifying the transmitting side of establishment of synchronization; and multiplexing means which, after synchronization is established, is for demultiplexing data sent to the receiving side via the lines used thus far as well as the additional line and sending the data to the LAN on the receiving side.

9. A LAN-WAN connecting apparatus in a communication system for allocating a band within which communication between a local area network (LAN) on a transmitting side and a LAN on a receiving side via a wide area network (WAN) is performed and performing the communication between LANS within limits of the allocated band, the apparatus comprising:

a demultiplexer and multiplexer means for demultiplexing a frame, which has been accepted from the LAN on the transmitting side, into data constituting smallest units of information, transmitting this data to a plurality of lines, multiplexing data, which is sent to the receiving side via each line so as to generate a frame, and sending the generated frame to the LAN on the receiving side;

monitoring means for monitoring traffic between LANs;

band calculating means for obtaining a band required for communication between LANs based upon monitored traffic; and line increasing and decreasing means for increasing, decreasing or maintaining the number of lines, which are used in communication between LANs, based upon the band obtained, wherein said demultiplexer and multiplexer means comprises:

means which, in a case where the number of lines is decreased, is for transmitting data, on a line to be disconnected, to the receiving side upon setting a line-disconnection flag in the data, and transmitting data on other lines without setting a line-disconnection flag in the data; and multiplexing means for recognizing said line to be disconnected based upon the line-disconnection flag, and thenceforth multiplexing data sent to the receiving side via lines other than the line to be disconnected and sending this multiplexed data to the LAN on the receiving side.

10. A communication method in a connecting apparatus for performing communication between first type networks via a second type network within an allocated band allocated by said apparatus, the method comprising the steps of:

obtaining traffic between a first type network on a transmitting side and a first type network on a receiving side when a request for transfer of a new frame has been issued from a terminal which is connected to the first type network on the transmitting side;

obtaining a band required for the transfer of the new frame on the basis of the traffic obtained in said traffic obtaining step; and performing communication upon increasing the allocated band for communication by an amount equivalent to the band obtained in said band obtaining step.

11. A communication method in a connecting apparatus, for performing communication between a first type network on a transmitting side and a network first type on a receiving side via a second type network within a band allocated by said apparatus, the method comprising the steps of:

demultiplexing a frame, which has been received from the first type network on the transmitting side, into data constituting smallest units of information, and transmitting this data via a plurality of lines;

multiplexing data, which is sent to the receiving side via each line, on the receiving side so as to generate a frame and sending said generated frame to the first type network on the receiving side;

obtaining traffic between the first type network on the transmitting side and the first type network on the receiving side when a request for transfer of a new frame has been issued from a terminal which is connected to the first type network on the transmitting side;

obtaining a band required for the transfer of the new frame on the basis of the traffic; and performing communication upon increasing the number of lines used in communication in such a manner that the band obtained is satisfied.

12. The method according to claim 11, wherein the traffic between LANs is obtained using a number of frames residing in a buffer provided between LANs or time of residence in the buffer.

13. The method according to claim 11, wherein the traffic between LANs is obtained using line utilization rate calculated based upon a band allocated to LAN-WAN-LAN communication and the band in actual use.

14. The method according to claim 11, wherein there is provided a table for storing required bands in correspondence with traffic or types of application, the required band being obtained by referring to said table.

15. The method according to claim 11, wherein there is provided a table for storing optimum numbers of lines commensurate with bands, the number of lines being decided by referring to said table.

16. A communication method in a connecting apparatus, for performing communication between a first type network on a transmitting side and a first type network on a receiving side via a second type network within a band allocated by said apparatus, the method comprising the steps of:

demultiplexing a frame, which has been received from the first type network on the transmitting side, into data constituting small units of information, and transmitting this data via a plurality of lines;

multiplexing data, which is sent to the receiving side via each line, on the receiving side so as to generate a frame and sending the generated frame to the first type network on the receiving side;

monitoring traffic between the first type network on the transmitting side and the first type network on the receiving side;

obtaining a band required for communication between the first type network on the transmitting side and the first type network on the receiving side based upon monitored traffic; and performing communication upon increasing, decreasing or maintaining the number of lines, which are used in communication between first type networks, based upon the obtained band.

17. The method according to claim 16, wherein a line-tariff monitoring timer is provided for each line, the traffic being obtained before the line-tariff monitoring timer runs out of time.

18. The method according to claim 16, further comprising reserving a prescribed number of lines in a case where a line is disconnected, and refraining from using these reserved lines in communication with other LANs.

19. The method according to claim 16, wherein the reserved lines are used as new lines in a case where the number of lines is to be increased.

20. A connecting apparatus in a communication system for allocating a band within which communication between a first type network on a transmitting side and a first type network on a receiving side via a second type network is performed and performing the communication between first type networks within an allocated band, the apparatus comprising:

demultiplexer and multiplexer means for demultiplexing a frame, which has been accepted from the first type network on the transmitting side, into data constituting small units of information, transmitting this data to a plurality of lines, multiplexing data, which is sent to the receiving side via each line so as to generate a frame, and sending the generated frame to the first type network on the receiving side;

monitoring means for monitoring traffic between LANs;

band calculating means for obtaining a band required for communication between first type networks, based upon monitored traffic; and line increasing and decreasing means for increasing, decreasing or maintaining the number of lines, which are used in communication between first type network, based upon the band obtained.

21. A communication method in a connecting apparatus, for performing communication between first type networks via a second type network within an allocated band, which is allocated by the connecting apparatus, the method comprising the steps of:

identifying a type of application of a terminal that has issued a request for transfer of a new frame, by referring to an application type information in the new frame, when said request for transfer of a new frame has been issued;

obtaining a band required for the transfer of the new frame on the basis of the type of application; and performing communication by increasing the allocated band for communication by an amount equivalent to the band obtained.

22. A communication method in a connecting apparatus, for performing communication between a first type network on a transmitting side and a first type network on a receiving side via a second type network within a band which is allocated by the connecting apparatus, the method comprising the steps of:

demultiplexing a frame, which has been received from the first type network on the transmitting side, into data constituting small units of information, and transmitting this data via a plurality of lines;

multiplexing data, which is sent to the receiving side via each line, on the receiving side so as to generate a frame and sending the generated frame to the first type network on the receiving side;

identifying a type of application of a terminal that has issued a request for transfer of a new frame, when said request for transfer of a new frame has been issued;

obtaining a band required for the transfer of the new frame on the basis of the type of application; and performing communication upon increasing the number of lines used in communication in such a manner that the band obtained is satisfied.

23. A connecting apparatus in a communication system for allocating a band within which communication between a first type network on a transmitting side and a first type network on a receiving side via a second type network is performed and for performing the communication between first type networks within an allocated band, the apparatus comprising:

demultiplexer and multiplexer means for demultiplexing a frame, which has been accepted from the first type network on the transmitting side, into data constituting small units of information, transmitting this data to a plurality of lines, multiplexing data, which is sent to the receiving side via each line so as to generate a frame, and sending the generated frame to the first type network on the receiving side;

means for identifying a type of application of a LAN terminal which has issued a request for transfer of a new frame, when said request for transfer of a new frame has been issued;

band calculating means for obtaining a band required for the transfer of the new frame on the basis of the type of application; and line increasing means for increasing the number of lines used in communication in such a manner that the band obtained is satisfied.

* * * * *